United States Patent
Tachikake

(10) Patent No.: US 12,303,944 B2
(45) Date of Patent: May 20, 2025

(54) MATERIAL SEPARATION SYSTEM

(71) Applicant: KABUSHIKI KAISHA YASKAWA DENKI, Kitakyushu (JP)

(72) Inventor: Hiroki Tachikake, Fukuoka (JP)

(*) Notice: Subject to any disclaimer, the term of this patent is extended or adjusted under 35 U.S.C. 154(b) by 0 days.

(21) Appl. No.: 18/614,752

(22) Filed: Mar. 25, 2024

(65) Prior Publication Data

US 2024/0226963 A1  Jul. 11, 2024

Related U.S. Application Data

(63) Continuation of application No. PCT/JP2022/040228, filed on Oct. 27, 2022.

(30) Foreign Application Priority Data

Oct. 27, 2021  (JP) .................. 2021-175346

(51) Int. Cl.
*B07C 5/342* (2006.01)
*B07C 5/28* (2006.01)
(Continued)

(52) U.S. Cl.
CPC ............. *B07C 5/3422* (2013.01); *B07C 5/28* (2013.01); *G06T 7/0004* (2013.01); *G06T 7/50* (2017.01);
(Continued)

(58) Field of Classification Search
CPC ....... B07C 5/3422; B07C 5/28; G06T 7/0004; G06T 7/50; G06T 7/00; G06V 10/255;
(Continued)

(56) References Cited

U.S. PATENT DOCUMENTS

2019/0011183 A1   1/2019  Baumert et al.
2022/0203407 A1*  6/2022  Kumar ................ B07C 5/342
(Continued)

FOREIGN PATENT DOCUMENTS

CN    203177944    9/2013
JP    2002-005637  1/2002
(Continued)

OTHER PUBLICATIONS

International Search Report dated Jan. 10, 2023 for PCT/JP2022/040228.
International Preliminary Report on Patentability with Written Opinion dated May 10, 2024 for PCT/JP2022/040228.

*Primary Examiner* — Jacob S. Scott
*Assistant Examiner* — Miraj T. Patel
(74) *Attorney, Agent, or Firm* — SOEI PATENT & LAW FIRM

(57) ABSTRACT

A material separation system includes circuitry configured to acquire a composite image capturing a plurality of commingled pieces of material, and sets a number of candidate separation positions based on the composite image. The circuitry is further configured to identify, for each of the candidate separation positions, a subset of the plurality of commingled pieces of material, and calculate an estimated mass of each subset of the plurality of commingled pieces of material. The circuitry is further configured to determine a position for separating a predetermined mass of pieces of material from the plurality of commingled pieces of material, as a separation position, based on a comparison of the predetermined mass with the estimated mass corresponding to each of the candidate separation positions, and separate the predetermined mass of pieces of material from the plurality of commingled pieces of material at the separation position.

20 Claims, 14 Drawing Sheets

(51) Int. Cl.
*B25J 9/16* (2006.01)
*G06T 7/00* (2017.01)
*G06T 7/50* (2017.01)
*G06V 10/20* (2022.01)

(52) U.S. Cl.
CPC ........... *G06V 10/255* (2022.01); *B25J 9/1679* (2013.01); *B25J 9/1697* (2013.01)

(58) Field of Classification Search
CPC ......... B25J 9/1679; B25J 9/1697; G01G 9/00; G06Q 10/04
See application file for complete search history.

(56) References Cited

U.S. PATENT DOCUMENTS

2022/0327721 A1　10/2022　Tomimori
2025/0010484 A1*　 1/2025　Sun ........................ B25J 9/1653

FOREIGN PATENT DOCUMENTS

| | | |
|---|---|---|
| JP | 2011-053070 | 3/2011 |
| JP | 2018-052626 | 4/2018 |
| JP | 2019-504277 | 2/2019 |
| JP | 2020-194454 | 12/2020 |
| KR | 10-2234533 | 3/2021 |
| WO | 2017/109657 | 6/2017 |
| WO | 2020/044510 | 3/2020 |
| WO | 2021/065265 | 4/2021 |

* cited by examiner

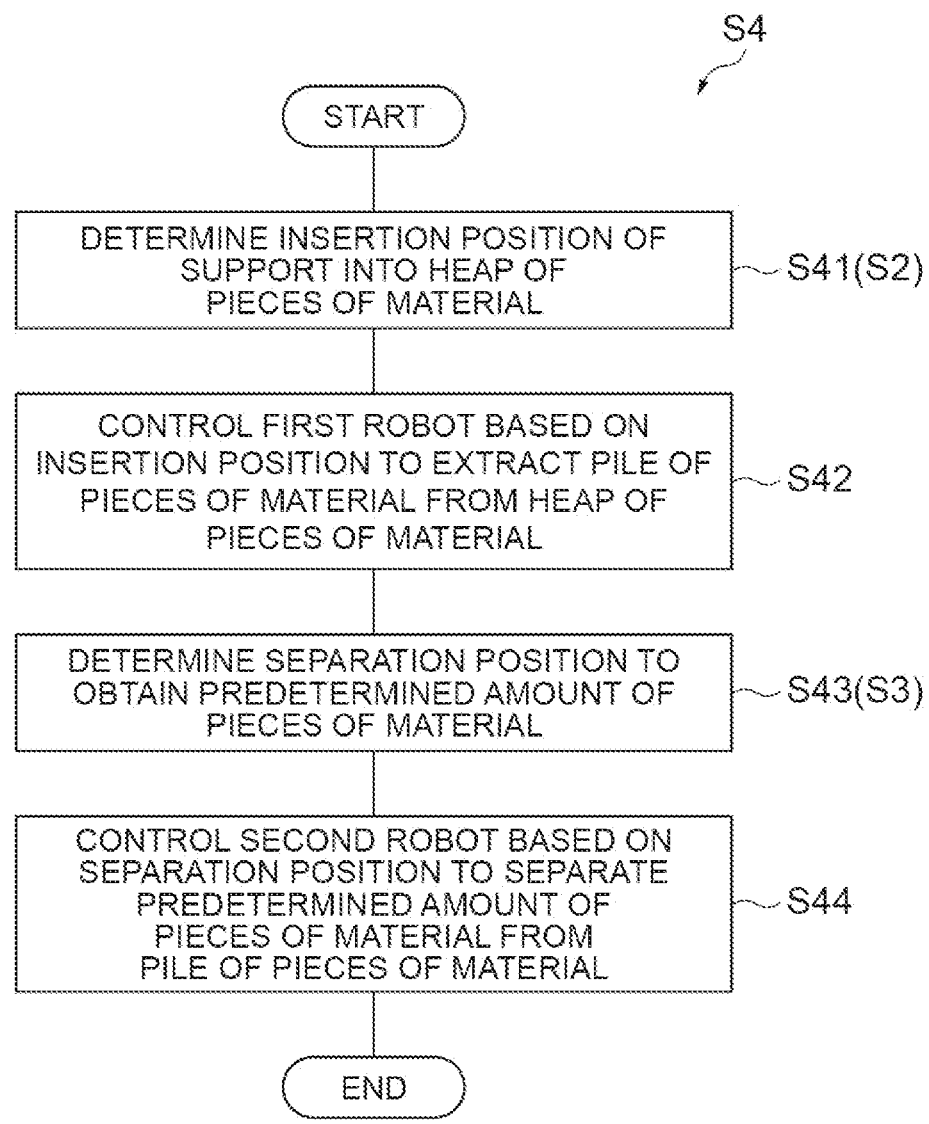

MATERIAL SEPARATION SYSTEM

CROSS-REFERENCE TO RELATED APPLICATIONS

This application is a continuation application of PCT Application No. PCT/JP2022/040228, filed on Oct. 27, 2022, which claims the benefit of priority from Japanese Patent Application No. 2021-175346, filed on Oct. 27, 2021. The entire contents of the above listed PCT and priority applications are incorporated herein by reference.

BACKGROUND

Field

An aspect of the present disclosure relates to a weighing system, a support control system, a weighing method, and a weighing program.

Description of the Related Art

Japanese Patent Application Publication No. 2018-52626 describes a separating device that separates items based on dimensions of the items, the number of ordered items, and a size of a food tray.

SUMMARY

A material separation system according to an aspect of the present disclosure includes circuitry configured to: acquire a composite image capturing a plurality of commingled pieces of material; set a number of candidate separation positions based on the composite image; identify, for each of the candidate separation positions, a subset of the plurality of commingled pieces of material; calculate an estimated mass of each subset of the plurality of commingled pieces of material; determine a position for separating a predetermined mass of pieces of material from the plurality of commingled pieces of material, as a separation position, based on a comparison of the predetermined mass with the estimated mass corresponding to each of the candidate separation positions; and separate the predetermined mass of pieces of material from the plurality of commingled pieces of material at the separation position.

A method of material separation according to an aspect of the present disclosure includes: acquiring a composite image capturing a plurality of commingled pieces of material; setting a number of candidate separation positions based on the composite image; identifying, for each of the candidate separation positions, a subset of the plurality of commingled pieces of material; calculating an estimated mass of each subset of the plurality of commingled pieces of material; determining a position for separating a predetermined mass of pieces of material from the plurality of commingled pieces of material, as a separation position, based on a comparison of the predetermined mass with the estimated mass corresponding to each of the candidate separation positions; and separating the predetermined mass of pieces of material from the plurality of commingled pieces of material at the separation position.

A non-transitory computer-readable storage medium according to an aspect of the present disclosure stores processor-executable instructions to: acquire a composite image capturing a plurality of commingled pieces of material; set a number of candidate separation positions based on the composite image; identify, for each of the candidate separation positions, a subset of the plurality of commingled pieces of material; calculate an estimated mass of each subset of the plurality of commingled pieces of material; determine a position for separating a predetermined mass of pieces of material from the plurality of commingled pieces of material, as a separation position, based on a comparison of the predetermined mass with the estimated mass corresponding to each of the candidate separation positions; and separate the predetermined mass of pieces of material from the plurality of commingled pieces of material at the separation position.

BRIEF DESCRIPTION OF THE DRAWINGS

FIG. 14 is a flowchart showing an example of a series of processes for extracting and separating pieces of material.

DETAILED DESCRIPTION

In the following description, with reference to the drawings, the same reference numbers are assigned to the same components or to similar components having the same function, and overlapping description is omitted.

Figure 1:
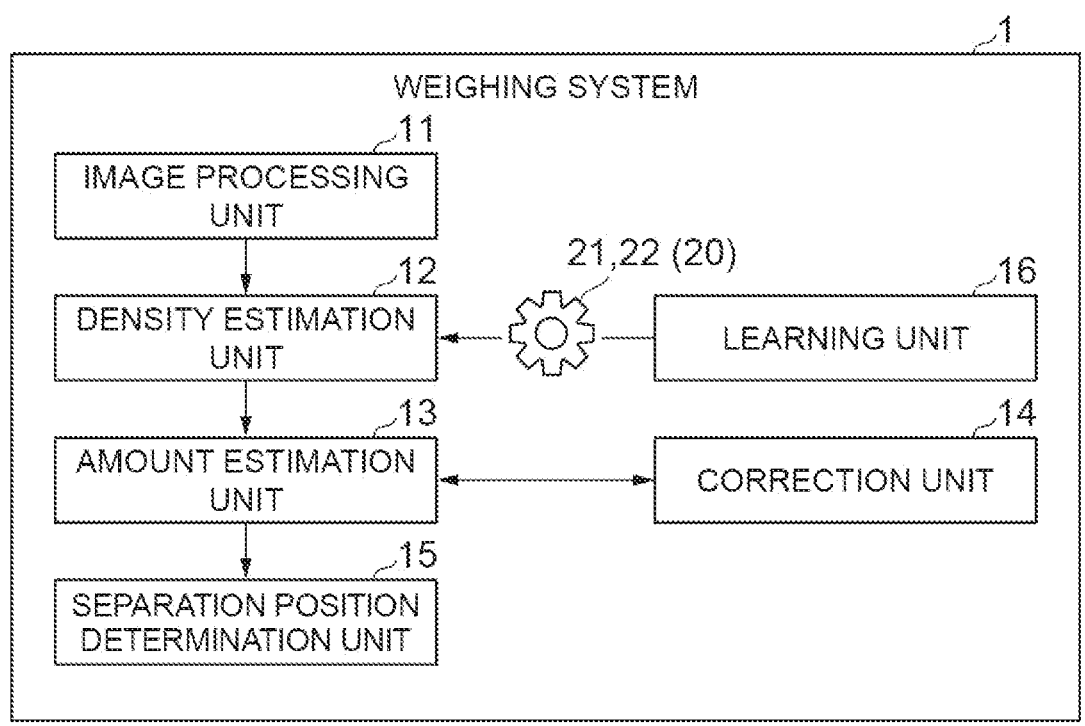
FIG. 1 is a diagram showing an example functional configuration of a weighing system.

A weighing system (or material separation system) 1 according to some examples (e.g. as illustrated in FIG. 1) is a computer system for determining a position that separates a predetermined amount (or predetermined mass) of pieces of material from a pile of pieces of material (or a plurality of commingled pieces of material) managed by mass. The piece of material refers to individual pieces of material that are formed relatively small. For example, the pieces of material are used to produce a given product. The "pieces of material managed by mass" refers to pieces of material managed by mass because the management by number is quite difficult or substantially impossible. Examples of pieces of material managed by mass include, but are not limited to, granular or powdered material, shredded material, and material provided as a paste. In some examples, the pieces of material are food that is quantitatively managed by mass. In the present disclosure, "food" includes food additives. Examples of management of pieces of material include, but are not limited to, storage, measurement, separation, and use. In the present disclosure, the "pieces of material managed by mass" is also simply referred to as "pieces of material". The weighing system 1 determines a position that separates a predetermined amount of pieces of material from a pile of such pieces of material. In the present disclosure, that position is also referred to as a "separation position". Due to the nature of the pieces of material described above, it is quite difficult or substantially impossible to obtain a predetermined amount of pieces of material depending by the number of pieces of material. In order to separate such pieces of material, the weighing system 1 analyzes a pile image (or composite image) that is an image of a pile of pieces of material to determine the separation position.

FIG. 1 is a diagram showing an example functional configuration of the weighing system 1. In some examples, the weighing system 1 includes an image processing unit 11, a density estimation unit 12, an amount estimation unit 13, a correction unit 14, a separation position determination unit 15, and a learning unit 16 as functional modules. The image processing unit 11 is a functional module that pre-processes a pile image capturing a pile of pieces of material in order to determine a separation position. The density estimation unit 12 is a functional module that estimates a density of pile of pieces of material based on the pile image. In some examples, the density estimation unit 12 executes the estimation using a machine learning model 20 that receives an input of the pile image and outputs the density. The amount estimation unit 13 is a functional module that calculates an estimated amount (or estimated mass) of a subset of pieces of material obtained by separating the pile of pieces of material, based on the density. The amount estimation unit 13 sets at least one candidate separation position (e.g., a plurality of candidate separation positions) that is a candidate for the separation position, and calculates an estimated amount for each candidate separation position. The correction unit 14 is a functional module that corrects the estimated amount as needed. The separation position determination unit 15 is a functional module that determines the separation position based on the estimated density. For example, the separation position determination unit 15 determines the separation position from at least one candidate separation position based on at least one estimated amount calculated using the density. The learning unit 16 is a functional module that generates the machine learning model 20 used in the density estimation unit 12, by machine learning. Thus, the machine learning model 20 is a learned model. In some examples, the learning unit 16 generates two types of machine learning model 20, which will be described later, and in the following, the two types are distinguished from a machine learning model 21 and 22 as needed.

Figure 2:
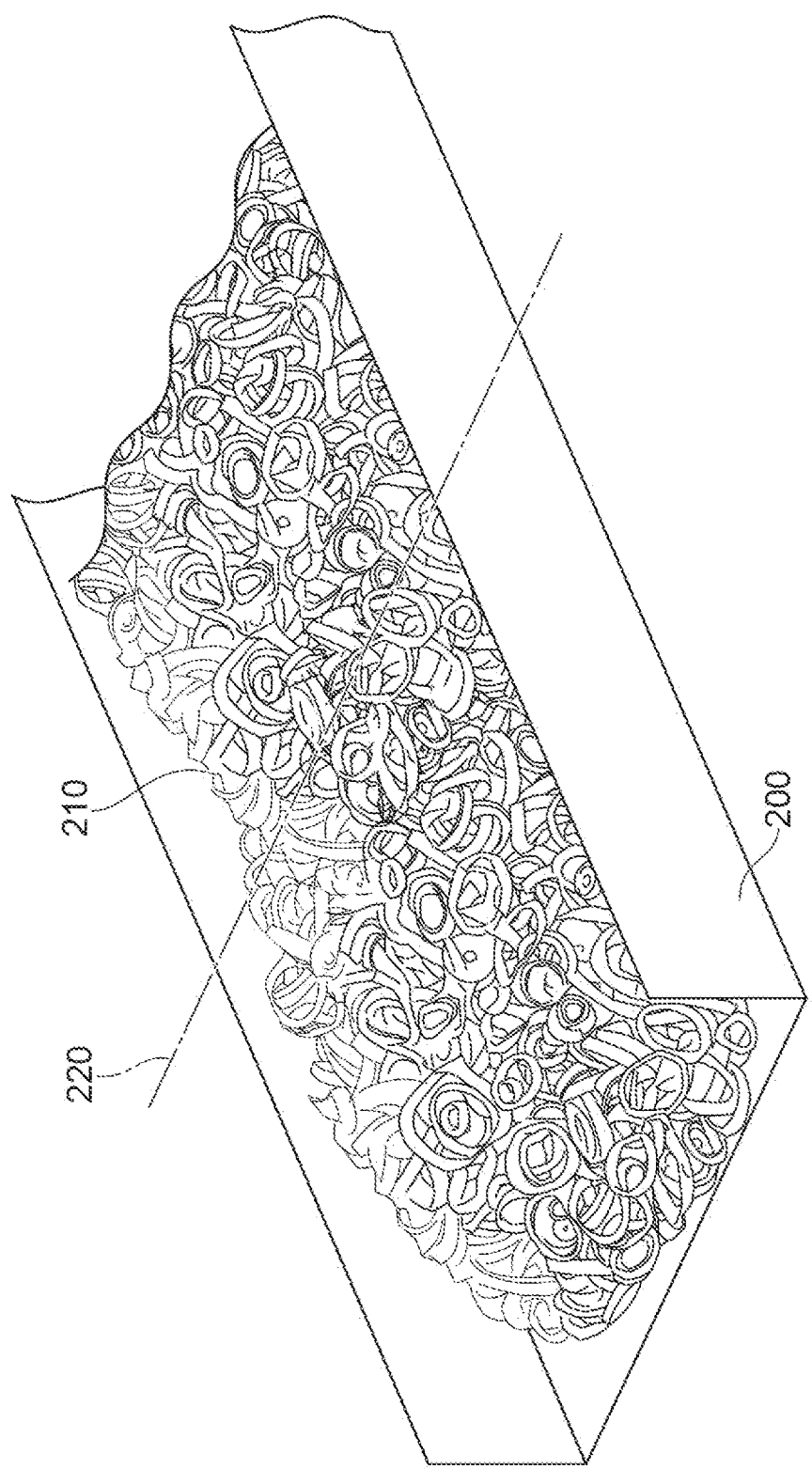
FIG. 2 is a diagram showing an example separation position.

FIG. 2 is a diagram showing an example separation position. In this example, a pile of foods 210 that are quantitatively managed by mass is placed on a support (or material extraction apparatus) 200, and the weighing system 1 determines a separation position 220 for adding a predetermined amount of foods 210 to a predetermined food item. The food item is an item provided to a customer, such as a meal, a boxed lunch, etc. The foods 210 are foodstuffs, for example cut foods.

The weighing system 1 may be implemented by any type of computer. The computer may be a general-purpose computer such as a personal computer or a business server, or may be incorporated into a dedicated device that executes specific processing. The weighing system 1 may be realized by one computer or may be realized by a distributed system including a plurality of computers.

Figure 3:
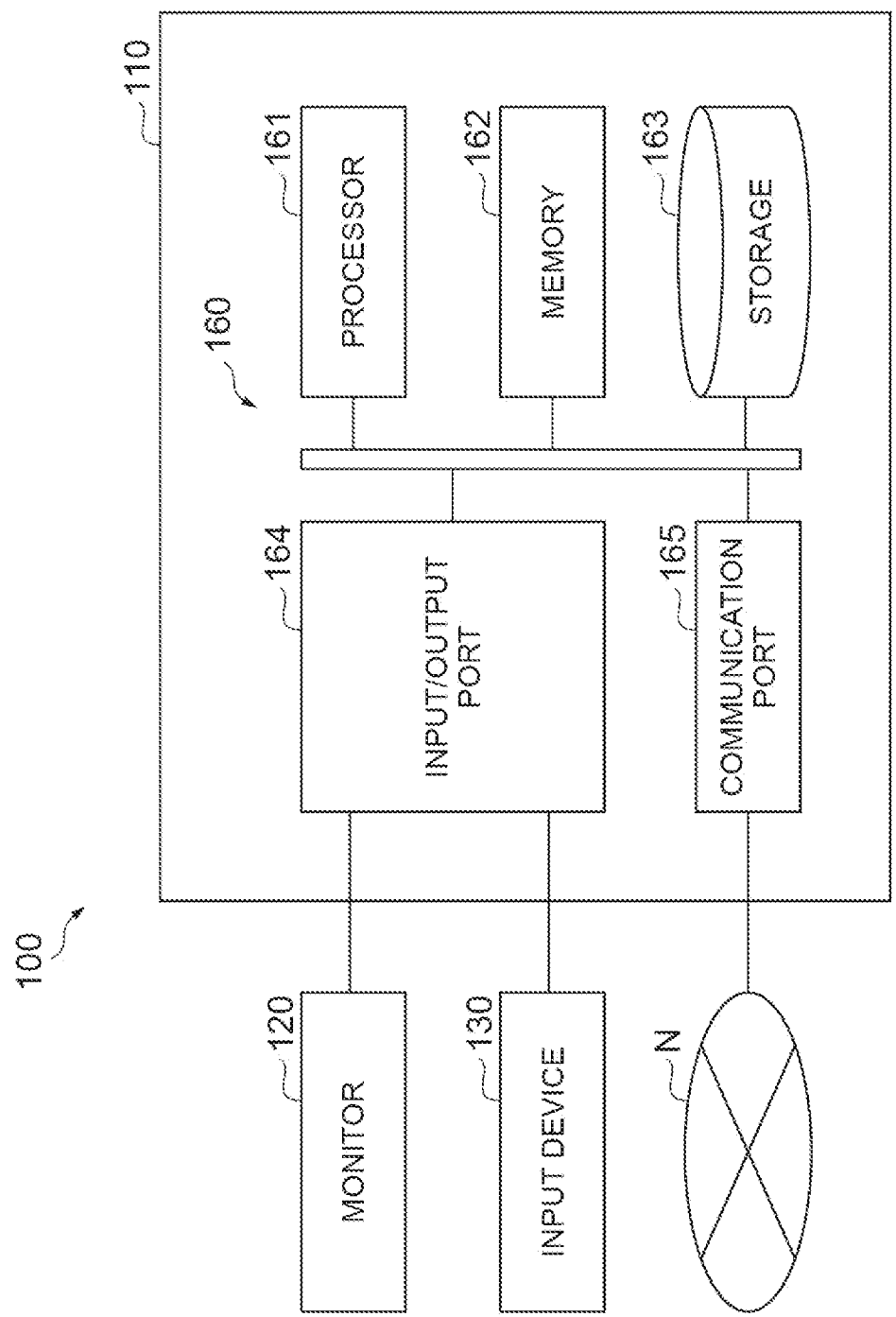
FIG. 3 is a diagram showing an example hardware configuration of a computer used in the weighing system.

FIG. 3 is a diagram showing an example hardware configuration of a computer 100 used in the weighing system 1. In this example, the computer 100 includes main body 110, a monitor 120, and an input device 130.

The main body 110 is a device that executes a main function of a computer. Main body 110 has circuitry 160, and the circuitry 160 has at least one of a processor 161, a memory 162, a storage 163, an input/output port 164, and a communication port 165. The storage 163 stores a program for configuring each functional module of the main body 110. The storage 163 is a computer-readable storage medium such as a hard disk, a nonvolatile semiconductor memory, a magnetic disk, or an optical disc. The memory 162 temporarily stores a program loaded from the storage 163, calculation results of the processor 161, and the like. The processor 161 executes the program in cooperation with the memory 162 to configure each functional module. The input/output port 164 inputs and outputs electrical signals to and from the monitor 120 or the input device 130 in response to commands from the processor 161. The input/output port 164 may input and output an electrical signal to and from another device. The communication port 165 performs data communication with other devices via a communication network N according to the command from the processor 161.

The monitor 120 is a device for displaying information output from the main body 110. The monitor 120 may be of any type as long as graphic display is possible, and examples thereof include a liquid crystal panel.

The input device 130 is a device for inputting information to the main body 110. The input device 130 may be anything as long as desired information may be input, and examples thereof include an operation interface such as a keypad, a mouse, or a manipulation controller.

The monitor 120 and the input device 130 may be integrated as a touch panel. The main body 110, the monitor 120, and the input device 130 may be integrated, such as a tablet computer.

Each functional module of the weighing system 1 is implemented by loading a weighing program (or material separation program) on the processor 161 or the memory 162 and causing the processor 161 to execute the program. The weighing program includes code for implementing each functional module of the weighing system 1. The processor 161 operates the input/output port 164 or the communication port 165 according to the weighing program, and reads and writes data in the memory 162 or the storage 163.

The weighing program may be provided after being fixedly recorded in a non-transitory storage medium such as a CD-ROM, a DVD-ROM, or a semiconductor memory. Alternatively, the weighing program may be provided through a communication network as data signals superimposed on a carrier.

Figure 4:
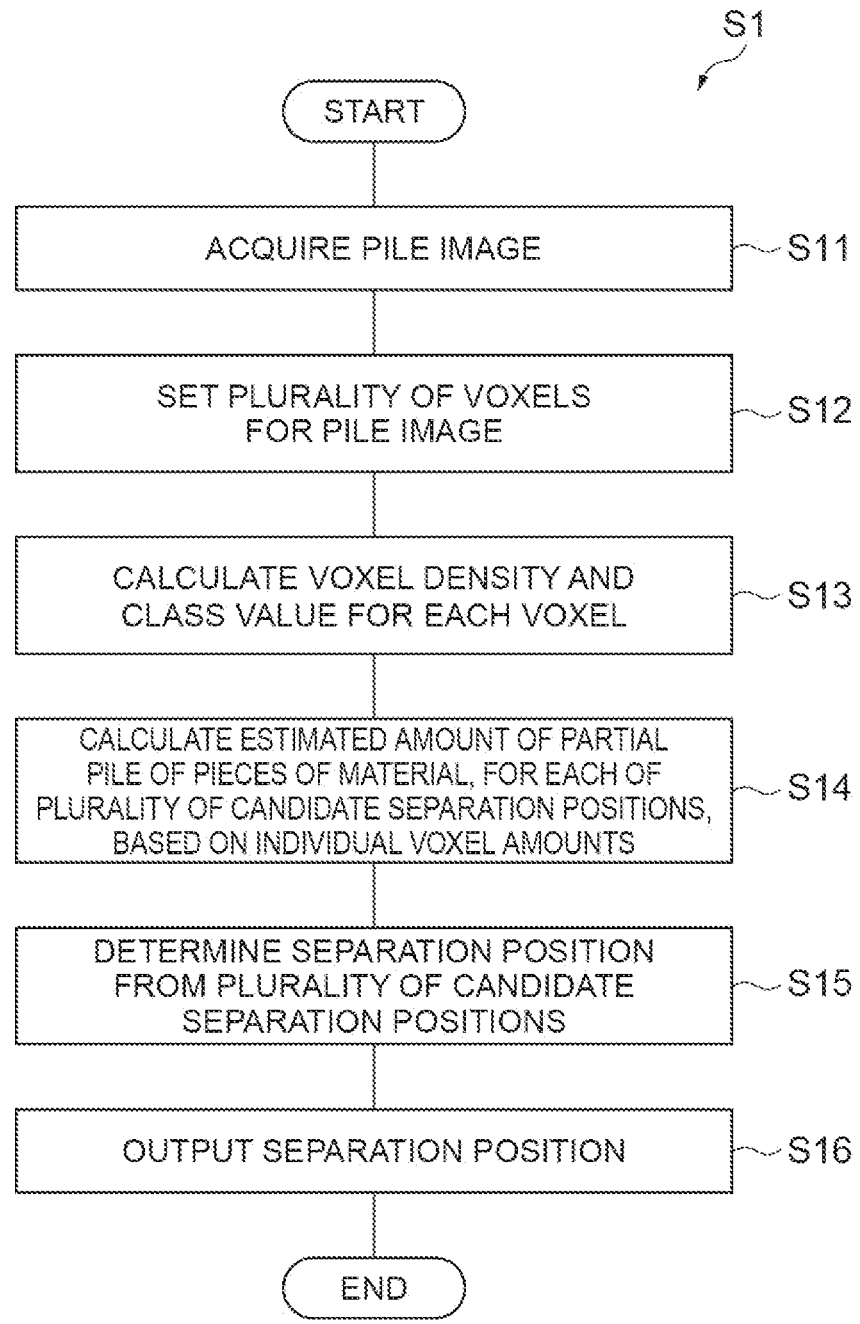
FIG. 4 is a flowchart showing an example of processing in the weighing system.

As an example of the weighing method according to the present disclosure, an example processing procedure executed by the weighing system 1 will be described with reference to FIG. 4. FIG. 4 is a flowchart showing an example of processing in the weighing system 1 as a processing flow S1. That is, the weighing system 1 executes the processing flow S1.

In step S11, the image processing unit 11 acquires a pile image capturing a pile of pieces of material. The pile image may be a still image or one frame image constituting a video. In some examples, the image processing unit 11 acquires a depth image capturing the pile of pieces of material. Alternatively, the image processing unit 11 may acquire a set of an RGB image and a depth image that capture the pile of pieces of material. The image processing unit 11 may receive the pile image sent from a camera or other computer. Alternatively, the image processing unit 11 may receive the pile image input by a user, or may read the pile image from a predetermined storage device based on a user input.

In step S12, the image processing unit 11 sets a plurality of voxels for the pile image. The image processing unit 11 sets the plurality of voxels for the pile of pieces of material captured in the pile image. In the present disclosure, the voxel is a virtual three-dimensional shape processed as a minimum unit.

Figure 5:
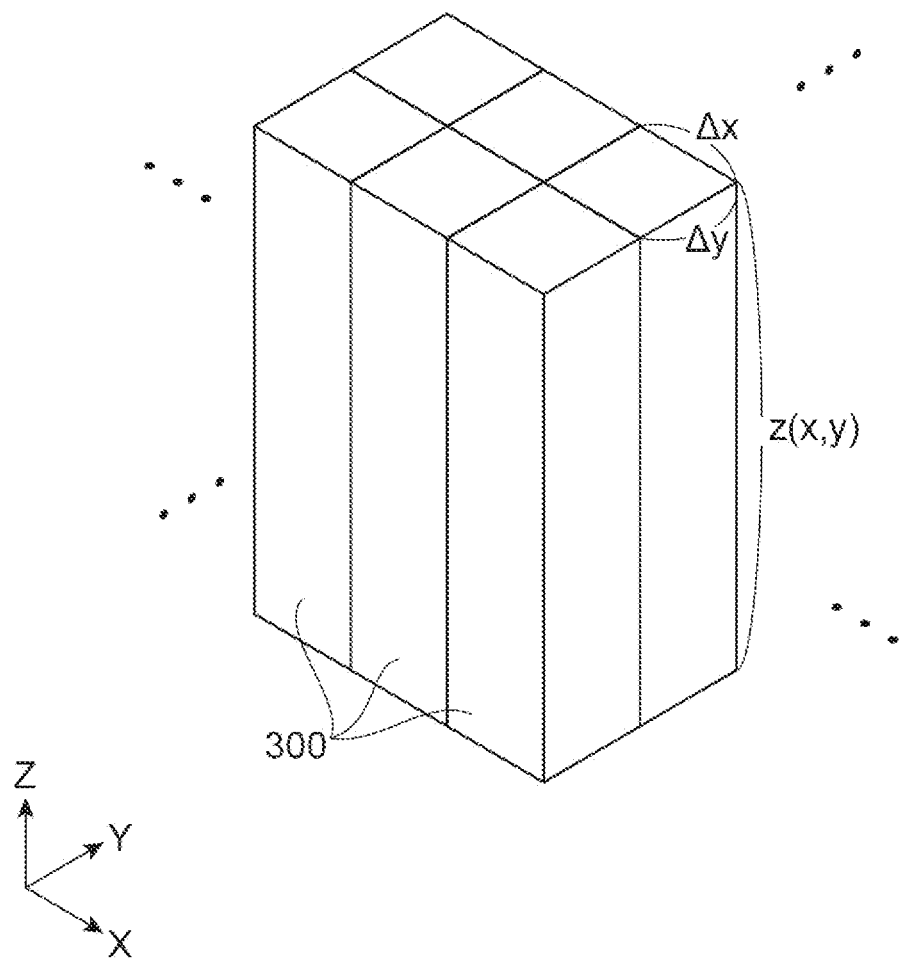
FIG. 5 is a diagram for explaining voxels.

FIG. 5 is a diagram for explaining voxels. In some examples, each voxel 300 is a rectangular solid that is set based on the X-axis and the Y-axis defined along the planar direction of the pile image and the Z-axis defined along the depth direction of the pile image. In some examples, the image processing unit 11 sets the voxel 300 for each pixel of the pile image. Each voxel 300 is defined by a side of length $\Delta x$ along the X-axis direction, a side of length $\Delta y$ along the Y-axis direction, and a side of length $z(x, y)$ along the Z-axis direction. The $z(x, y)$ is a length in the Z-axis direction of a voxel arranged at a position $(x, y)$ on the XY plane. The lengths $\Delta x$ and $\Delta y$ are common to all the voxels 300. On the other hand, the lengths $z(x, y)$ are distances from a lower surface to a top surface of the pile of pieces of material along the Z-axis direction, and may be different in each voxel 300 depending on at least one of a shape of the pile of pieces of material and a shape of the support surface (or surface of the material extraction apparatus) on which the pile is placed.

In some examples, the image processing unit 11 analyzes the pile image to identify an area where pieces of material may be present, and sets a plurality of voxels in that area. In a case where the depth image is used, the image processing unit 11 analyzes the depth image, calculates distances in the depth direction for the individual voxels, and sets the lengths $z(x, y)$ of the individual voxels based on the distances.

Returning to FIG. 4, in step S13, the density estimation unit 12 calculates a voxel density and a class value for each of the plurality of voxels. The voxel density is a density of pieces of material in a voxel. The class value is a value indicating whether pieces of material are present in the voxel. In some examples, the class value is represented by binary values of "0" indicating that pieces of material do not exist in the voxel and "1" indicating that pieces of material exist in the voxel.

In some examples, the density estimation unit 12 calculates the voxel density for each of the plurality of voxels using the machine learning model 21 that receives an input of the pile image and outputs the voxel density. The machine learning model 21 processes the pile image to calculate a voxel density $d_{x,y}(I; \theta)$ for each of the plurality of voxels. The notation "$d_{x,y}(I; \theta)$" means a voxel density of a voxel located at position $(x, y)$, which is obtained by processing the pile image I by the machine learning model 21 having parameters $\theta$.

In some examples, the density estimation unit 12 calculates the class value for each of the plurality of voxels using a machine learning model 22 that receives an input of the pile image and outputs the class value. The machine learning model 22 processes the pile image to calculate a class value $c_{x,y}(I; \theta)$ for each of the plurality of voxels. The notation "$c_{x,y}(I; \theta)$" means a class value of a voxel located at position $(x, y)$, which is obtained by processing the pile image I by the machine learning model 22 having parameters $\theta$.

In step S14, the amount estimation unit 13 calculates an estimated amount (or estimated mass) of a subset of pieces of material, for each of a plurality of candidate separation positions, based on individual voxel amounts (or individual voxel masses). The voxel amount (or voxel mass) refers to an amount (or mass) of pieces of material in a voxel. The amount estimation unit 13 sets a plurality of candidate separation positions in an area in which a plurality of voxels is set. In some examples, the amount estimation unit 13 sets the plurality of candidate separations based on the pile image, and identifies, for each of the candidate separation positions, the subset of pieces of material. The amount estimation unit 13 then calculates, for each candidate separation position, the estimated amount of a subset of pieces of material obtained by separation at the candidate separation position. For example, the amount estimation unit 13 sets the plurality of candidate separation positions at predetermined intervals from the end of the pile of pieces of material toward the center of the pile, and calculates the estimated amount for each candidate separation position. In some examples, the amount estimation unit 13 calculates the estimated amount $m(I; \theta)$ at each candidate separation position by Equation (1).

[Equation 1]

$$m(I; \theta) = \int c(I; \theta) d(I; \theta) z(x, y) dx dy = \sum_{x,y} c_{x,y}(I; \theta) d_{x,y}(I; \theta) z(x, y) \Delta x \Delta y \quad (1)$$

Equation (1) means that a sum of a plurality of voxel amounts corresponding to a plurality of voxels existing in a section between a reference position set in an area where a pile of pieces of material may exist and a candidate separation position is calculated as an estimated amount of a subset of pieces of material. Each voxel amount estimated is the product of the voxel density $d_{x,y}(I; \theta)$ and a voxel volume $z(x, y)\Delta x\Delta y$, and thus represents a mass. In some examples, the amount estimation unit 13 calculates the voxel volume based on a distance in the depth direction obtained from the depth image. In a case where the class value $c_{x,y}(I; \theta)$ is the above-mentioned binary value, if the class value of a certain voxel is 1, the voxel amount of that voxel is used as it is, and if the class value is 0, that voxel amount is regarded as 0.

As shown in Equation (1), the amount estimation unit 13 calculates the voxel amount based on the voxel density, for each of the plurality of voxels. For example, the amount estimation unit 13 calculates the voxel amount based on the class value and the voxel density for each voxel. The amount estimation unit 13 calculates the estimated amount $m(I; \theta)$ based on the voxel amount of each voxel. Equation (1) shows an example of calculating an estimated mass of the subset based on the density of the pile of pieces of material and the volume of the subset, as the estimated amount.

Figure 6:
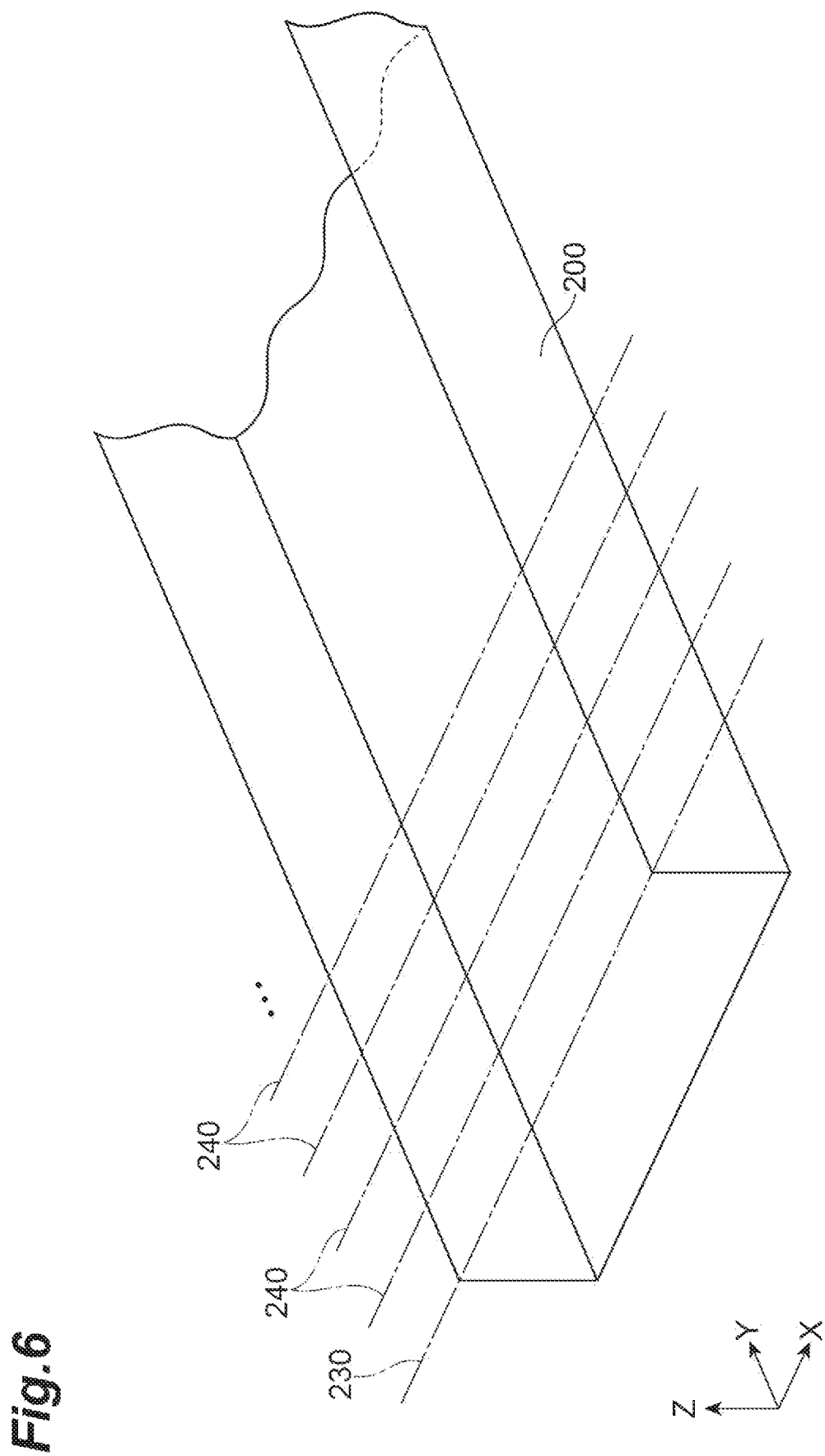
FIG. 6 is a diagram showing an example setting of candidate separation positions.

In some examples, the amount estimation unit 13 sets a reference position at one end of an area where the pile of pieces of material may exist, and sets a plurality of candidate separation positions for each predetermined interval from the reference position. The amount estimation unit 13 may set the interval based on at least one of $\Delta x$ and $\Delta y$, which are the lengths of the sides of the voxel, and for example, may set at least one of a multiple of $\Delta x$ and a multiple of $\Delta y$ as the interval. FIG. 6 is a diagram showing an example setting of the candidate separation positions, and shows the support 200 shown in FIG. 2 as an area where the pile of pieces of material may exist. For example, the amount estimation unit 13 sets one end of the support 200 as a reference position 230, and sets a plurality of candidate separation positions

240 at an interval (n×Δy) along the Y-axis (n is a positive integer). That is, the amount estimation unit 13 may set a plurality of candidate separation positions along one coordinate axis of a coordinate system indicating a real space in which the pile of pieces of material is located.

In some examples, in step S14, the correction unit 14 corrects the estimated amount for each of the plurality of candidate separation positions. The correction unit 14 corrects the estimated amount (or estimated mass) based on a relationship between samples of estimated amount (or estimated mass) calculated in the past and samples of actual amount (or actual mass) of pieces of material actually separated in the past at a separation position corresponding to the estimated amount. The data of these samples are previously stored in a predetermined database. The correction unit 14 refers to the database to calculate the relationship between the estimated amount and the actual amount.

Figure 7:
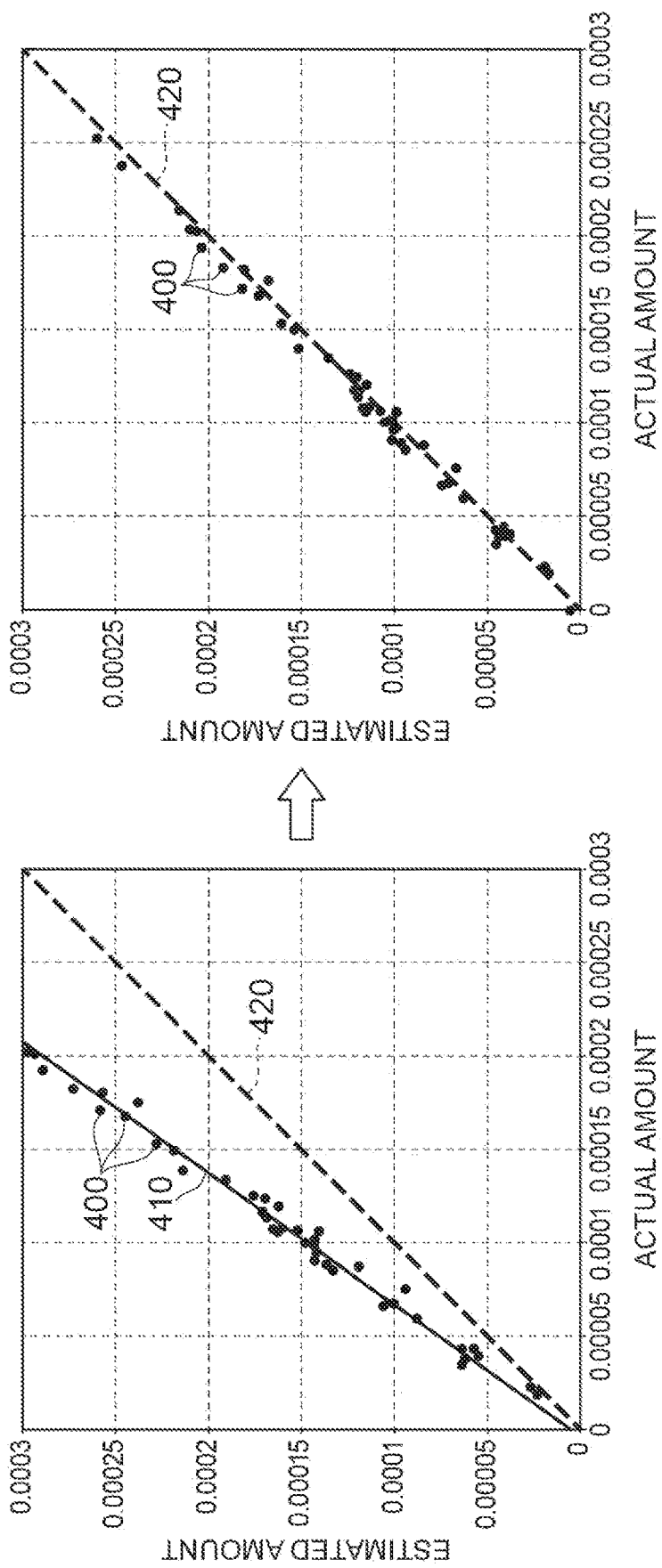
FIG. 7 depicts graphs showing an example relationship between estimated amounts and actual amounts.

FIG. 7 is a graph showing an example of the relationship. The vertical axis and horizontal axis of the graph indicate the estimated amount and the actual amount, respectively. Each sample point 400 on the graph indicates a correspondence between the estimated amount and the actual amount. The correction unit 14 executes regression analysis based on these sample points 400 to determine $m_{pred}=a \cdot m_{act}+b$, which is a linear formula indicating the relationship between an estimated amount $m_{pred}$ and an actual amount $m_{act}$. A linear formula indicating an ideal relationship between the estimated amount $m_{pred}$ and the actual amount $m_{act}$ is $m_{pred}=m_{act}$. FIG. 7 shows a linear formula 410 obtained by the regression analysis and an ideal linear formula 420 in which the actual amount is regarded as a true value. The correction unit 14 calculates a correction coefficient for converting the relationship between the estimated amount and the actual amount from the linear formula 410 to the linear formula 420, and corrects the estimated amount for each candidate separation position using the correction coefficient. In the example of FIG. 7, the correction coefficients are an inverse number 1/a of the inclination of the linear formula 410 and −b for canceling the intercept of the linear formula 410. For example, in a case where the estimated amount $m_{pred}'$ calculated by the amount estimation unit 13 is finally corrected to the estimated amount $m_{pred}^*$, the correction unit 14 calculates $m_{pred}^* = m_{pred}'/a - b$.

Returning to FIG. 4, in step S15, the separation position determination unit 15 determines a separation position from the plurality of candidate separation positions. For example, the separation position determination unit 15 compares of the predetermined amount with a plurality of estimated amounts corresponding to the plurality of candidate separation positions, and determines the separation position based on that comparison. In some examples, the separation position determination unit 15 determines the candidate separation position that minimizes an error between the estimated amount and the predetermined amount as the separation position. In a mass-based determination, the separation position determination unit 15 determines the candidate separation position that minimizes an error between an estimated mass and a predetermined mass as the separation position. Since the estimated amount is calculated based on individual voxel amounts, it may be said that the separation position is determined based on the voxel amount of each of the plurality of voxels.

Referring again to FIG. 6, the determination of separation position based on the error will be described. In an example of FIG. 6, a range along the Y-axis direction is regarded as [0, $y_{max}$]. The fact y=0 corresponds to the reference position 230 and the fact y=$y_{max}$ corresponds to a candidate separation position 240 farthest from the reference position 230. In this case, the separation position determination unit 15 determines a candidate separation position y* represented by Equation (2) as the separation position.

[Equation 2]

$$y^* = \mathrm{argmin}_y |m_{target} - m(I; \theta)|, \text{subject to } y \in [q, y_{max}] \quad (2)$$

Equation (2) means that the candidate separation position y* in which an error between the estimated amount $m(I; \theta)$ and the predetermined amount $m_{target}$ is minimized is obtained from the range [0, $y_{max}$].

Figure 8:
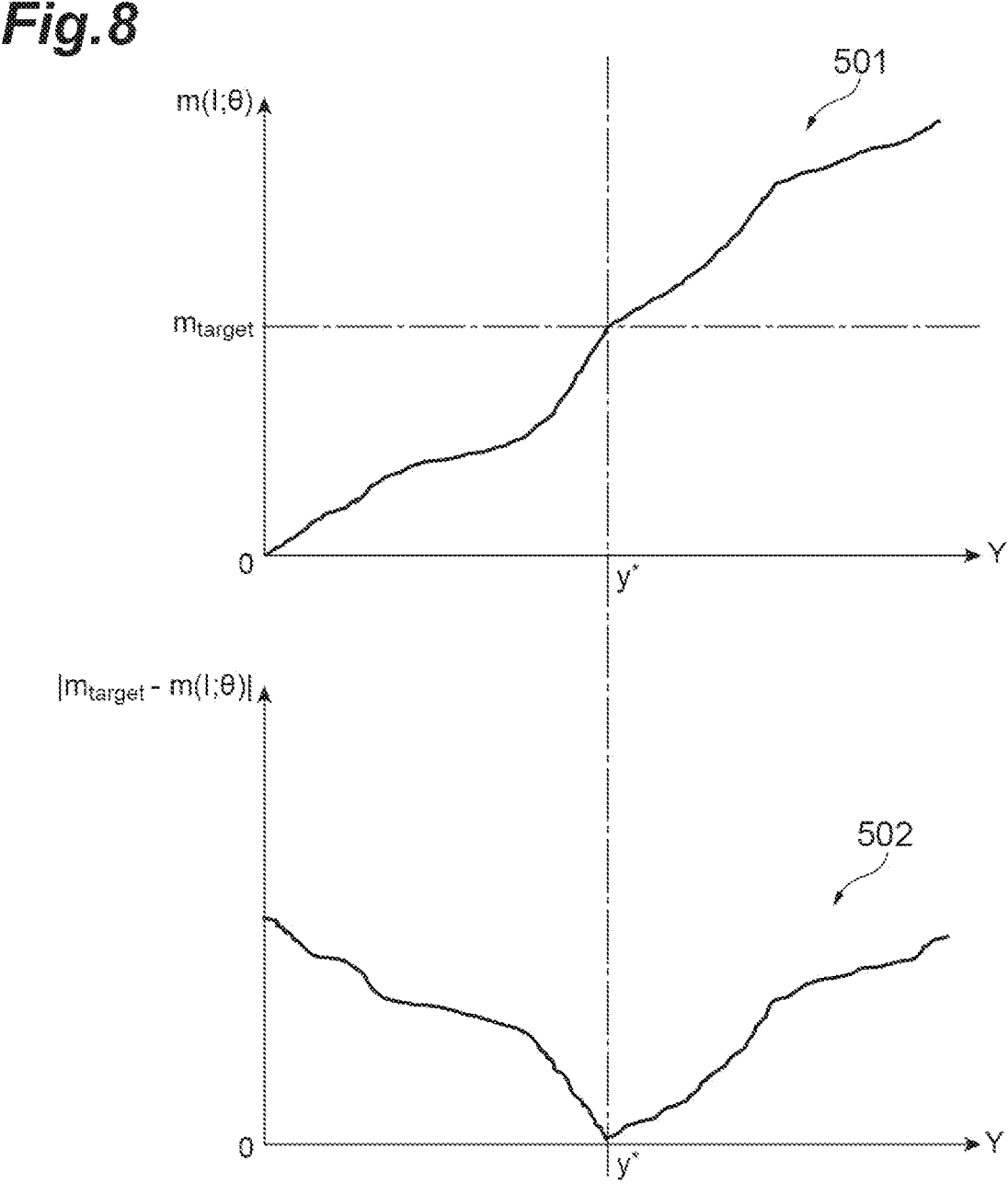
FIG. 8 is a graph for explaining a determination of a separation position.

FIG. 8 is a graph for explaining the determination of the separation position using Equation (2). The vertical axis of a graph 501 represents the estimated amount and the horizontal axis represents the candidate separation position along the Y direction. The vertical axis of a graph 502 represents the error between the estimated amount and the predetermined amount, and the horizontal axis represents the candidate separation position along the Y direction. 0 on the horizontal axis represents the reference position 230, and y* represents a goal position. In a case where the estimated amount and the error are calculated in order from the reference position 230, the estimated amount increases as the candidate separation position changes, and thus the error decreases. After a certain candidate separation position, the error increases. The minimum error may be a value greater than 0.

Returning to FIG. 4, in step S16, the separation position determination unit 15 outputs the determined separation position. For example, the separation position determination unit 15 may output the separation position to a device (e.g., a robot) that separates the predetermined amount of pieces of material from the pile of pieces of material. That is, the separation position determination unit 15 may cause a predetermined device, such as a robot, to separate the predetermined amount of pieces of material from the pile of pieces of material at the separation position. Alternatively, the separation position determination unit 15 may store the separation position in a storage unit such as the storage 163. Alternatively, the separation position determination unit 15 may display the separation position on the monitor 120 in the form of text, moving image or still image by computer graphics (CG), etc.

As described above, the density estimation unit 12 may calculate the voxel density or class value using the machine learning model 20. In some examples, the learning unit 16 generates the machine learning model 20 in advance to execute the processing flow S1, and the density estimation unit 12 uses the machine learning model 20 to calculate the voxel density or class value. The generation of the machine learning model 20 by the learning unit 16 corresponds to the learning phase. The utilization of the machine learning model 20 by the density estimation unit 12 corresponds to the operation phase.

As described above, the learning unit 16 generates the machine learning model 20 by the machine learning. The machine learning refers to a method of autonomously finding a law or rule by repeatedly learning based on given information. The machine learning model 20 is constructed using an algorithm and a data structure. In some examples, the machine learning model 20 is a calculation model constructed by a neural network such as a convolutional neural network (CNN).

In some examples, the learning unit 16 generates the machine learning model 22 by executing the machine learning based on errors between estimation results of the class value of each voxel set in an image and ground truth corresponding to the estimation results. For the machine learning, a mask image $I_{mask}$ in which ground truth $c_{gt\_x, y}(I)$ of the class value is associated with each pixel of an original image $I_{org}$ capturing a pile of pieces of material is prepared as training data. The learning unit 16, for example, accesses a predetermined database that stores a plurality of mask images $I_{mask}$ as training data, and executes the following processing for each mask image $I_{mask}$. That is, the learning unit 16 inputs the mask image $I_{mask}$ into a predetermined machine learning model, and obtains an estimation result of the class value of each pixel output from the machine learning model. The learning unit 16 executes backpropagation based on an error between the estimation result and the ground truth of each class value to update parameters in the machine learning model. The learning unit 16 repeats the learning until a predetermined termination condition is met to obtain the machine learning model 22.

In some examples, the learning unit 16 executes the machine learning based on an error between an estimated amount of a subset and ground truth corresponding to the estimated amount to generate the machine learning model 21. For the machine learning, a record including a mask image $I_{mask}$, a separation position $y_{obs}$, ground truth mobs of an amount of a subset of pieces of material corresponding to the separation position, and ground truth $z_{obs}(x, y)$ of a distance in the depth direction in each pixel is prepared as training data. For example, the learning unit 16 accesses a predetermined database that stores a plurality of the records as the training data, and executes the following processing for each record. That is, the learning unit 16 inputs the mask image to a predetermined machine learning model, and obtains an estimation result of the voxel density of each pixel output from the machine learning model. The learning unit 16 calculates an estimated amount of the subset corresponding to the separation position $y_{obs}$ based on the estimation result. Then, the learning unit 16 executes back propagation based on an error between the estimated amount and the ground truth mobs to update parameters in the machine learning model. The learning unit 16 repeats the learning until a predetermined termination condition is met to obtain the machine learning model 21.

It should be noted that the generated machine learning model 20 is a calculation model estimated to be optimal, and is not necessarily a "calculation model that is optimal in reality".

The machine learning model 20 may be ported between computer systems. Thus, the density estimation unit 12 may use the machine learning model 20 generated by another computer system.

Figure 9:
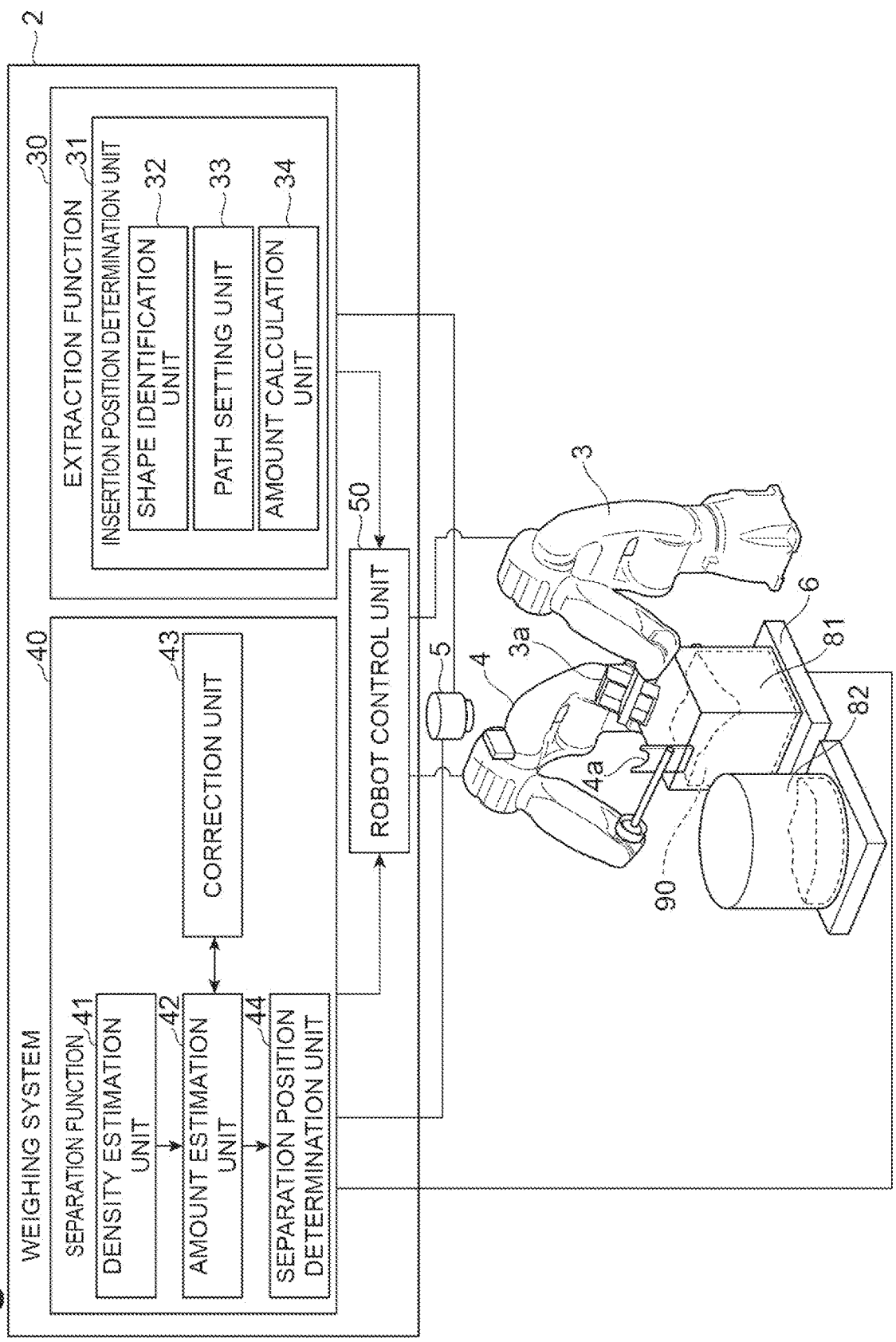
FIG. 9 is a diagram showing an example functional configuration and an example application of a weighing system.

A weighing system (or material separation system) 2 according to some examples (e.g., as illustrated in FIG. 9) is a computer system that determines an insertion position of a support (or material extraction apparatus) for extracting a pile of pieces of material from a heap of pieces of material (or stored material) accumulated in a predetermined area and determines a separation position to separate a predetermined amount (or predetermined mass) of pieces of material from the pile. The insertion position refers to a position at which the support is inserted into the heap of pieces of material. In some examples, the insertion position is a position at which the support is inserted into the heap of pieces of material to extract more than the predetermined amount of pile of pieces of material from the heap of pieces of material. The support is a structure for supporting the pile of pieces of material. For example, the support may be a tool having a shape such as a scoop, spoon, shovel, or the like.

FIG. 9 is a diagram showing an example functional configuration and an example application of the weighing system 2. In some examples, the weighing system 2 connects to a first robot 3, a second robot 4, a camera 5, and a weighing instrument 6 via a communication network. At least a portion of the communication network may be a wired network or a wireless network. At least a part of the communication network may include at least one of the Internet and an intranet. Alternatively, at least a part of the communication network may be simply implemented by one communication cable. A first container 81 containing a heap of pieces of material (or stored material) 90 is placed on the weighing instrument 6. That is, the heap of pieces of material 90 is accumulated in a predetermined area called the first container 81. A second container 82 for receiving measured pieces of material, i.e., a predetermined amount of pieces of material, is placed near the first container 81.

The first robot 3 is a machine that extracts a pile of pieces of material (or a plurality of commingled pieces of material) from the heap of pieces of material 90 in the first container 81 and transfers a predetermined amount of pieces of material obtained from the pile, to the second container 82. The first robot 3 has a support 3a having a shape like a shovel, as an end effector for performing that work.

The second robot 4 is a machine that separates a predetermined amount of pieces of material from a pile of pieces of material on the support 3a. In some examples, the second robot 4 levels the pile of pieces of material prior to that separation. The second robot 4 has a separating plate 4a as an end effector for performing these works.

In some examples, the outer edge of the separating plate 4a is shaped so as to correspond to the shape of the inner surface of the support 3a. For example, in response to the support 3a having a flat bottom surface, the lower end of the separating plate 4a extends linearly horizontally in a horizontal direction. In this case, the lower end may also be used to level the pile of pieces of material.

The camera 5 is an imaging device that captures an area image that is an image of the heap of pieces of material 90 (or an image of stored material 90) and a pile image (or composite image) that is an image of a pile of pieces of material. The camera 5 may be an RGB-D camera that outputs both a color image (RGB) and a depth (D).

The weighing instrument 6 is equipment for measuring a mass of the first container 81 containing the heap of pieces of material 90. The weighing instrument 6 has the accuracy enough to measure a reduced amount of a mass (or reduced mass) of the heap of pieces of material 90 when the support 3a scoops the pile of pieces of material from the heap of pieces of material 90.

The weighing system 2 includes an extraction function 30, a separation function 40, and a robot control unit 50 as functional components. The extraction function 30 is a group of functional modules for extracting the pile of pieces of material from the heap of pieces of material 90. The separation function 40 is a group of functional modules for separating a predetermined amount of pieces of material from the pile. The robot control unit 50 is a functional module that controls the first robot 3 and the second robot 4.

The extraction function 30 includes an insertion position determination unit 31, a shape identification unit 32, a path setting unit 33, and an amount calculation unit 34. The insertion position determination unit 31 is a functional module that determines the insertion position of the support 3a for extracting the pile of pieces of material from the heap of pieces of material 90, based on the area image. The shape identification unit 32 is a functional module that identifies the shape of the top surface of the heap of pieces of material 90 based on area image. The path setting unit 33 is a functional module that sets a virtual path of the support 3a passing through the heap of pieces of material 90. The amount calculation unit 34 is a functional module that calculates an amount (or mass) of the pile of pieces of material extracted by the support 3a passing through the virtual path, as an extraction amount (or extraction mass). The insertion position determination unit 31 determines the insertion position in conjunction with at least one of the shape identification unit 32, the path setting unit 33, and the amount calculation unit 34. For example, the insertion position determination unit 31 may set at least one candidate insertion position (e.g., a plurality of candidate insertion positions) that is a candidate of the insertion position, and determine the insertion position based on an extraction amount of each candidate insertion position. Alternatively, the insertion position determination unit 31 may determine the insertion position based on a shape of the top surface of the heap of pieces of material 90. In the example shown in FIG. 9, the insertion position determination unit 31 has the shape identification unit 32, the path setting unit 33, and the amount calculation unit 34 as submodules. The hierarchical relationship among these four functional modules is not limited, and for example, the insertion position determination unit 31, the shape identification unit 32, the path setting unit 33, and the amount calculation unit 34 may cooperate with each other while being independent from each other. In any event, the extraction function 30 is an example of the support control system.

The separation function 40 includes a density estimation unit 41, an amount estimation unit 42, a correction unit 43, and a separation position determination unit 44. The density estimation unit 41 is a functional module that estimates a density of the pile of pieces of material. The amount estimation unit 42 is a functional module that calculates an estimated amount (or estimated mass) of a subset of pieces of material obtained by separating the pile of pieces of material, based on the density. The amount estimation unit 42 sets at least one candidate separation position (e.g., a plurality of candidate separation positions) that is a candidate for the separation position, and calculates the estimated amount for each candidate separation position. The correction unit 43 is a functional module that corrects the estimated amount as needed. The separation position determination unit 44 is a functional module that determines separation position based on the estimated density. For example, the separation position determination unit 44 determines the separation position from the at least one candidate separation position based on at least one estimated amount calculated using the density.

The robot control unit 50 controls the first robot 3 or the second robot 4 based on output from the extraction function 30 or the separation function 40. The robot control unit 50 controls the first robot 3 based on the insertion position determined by the insertion position determination unit 31, and the first robot 3 scoops the pile of pieces of material 90 from the heap of pieces of material with the support 3a. The robot control unit 50 may control the second robot 4 to cause the second robot 4 to perform a process to level the top surface of the pile of pieces of material. The robot control unit 50 controls the second robot 4 based on the separation position determined by the separation position determination unit 44, and the second robot 4 separates the predetermined amount of pieces of material from the pile of pieces of material with the separating plate 4a. The robot control unit 50 controls the first robot 3 to cause the first robot 3 to perform the process of transferring the predetermined amount of pieces of material into the second container 82.

Each functional module in the weighing system 2 is implemented by loading a weighing program (or material separation program) on the processor 161 or the memory 162 and causing the processor 161 to execute the program. The weighing program includes code for implementing each functional module of the weighing system 2. The processor 161 operates the input/output port 164 or the communication port 165 according to the weighing program, and reads and writes data in the memory 162 or the storage 163.

The weighing program may be provided in a form divided into a first program (support control program) for realizing the extraction function 30 and a second program for realizing the separation function 40. Both the first and second programs may be provided by a storage medium or via a communication network.

Figure 10:
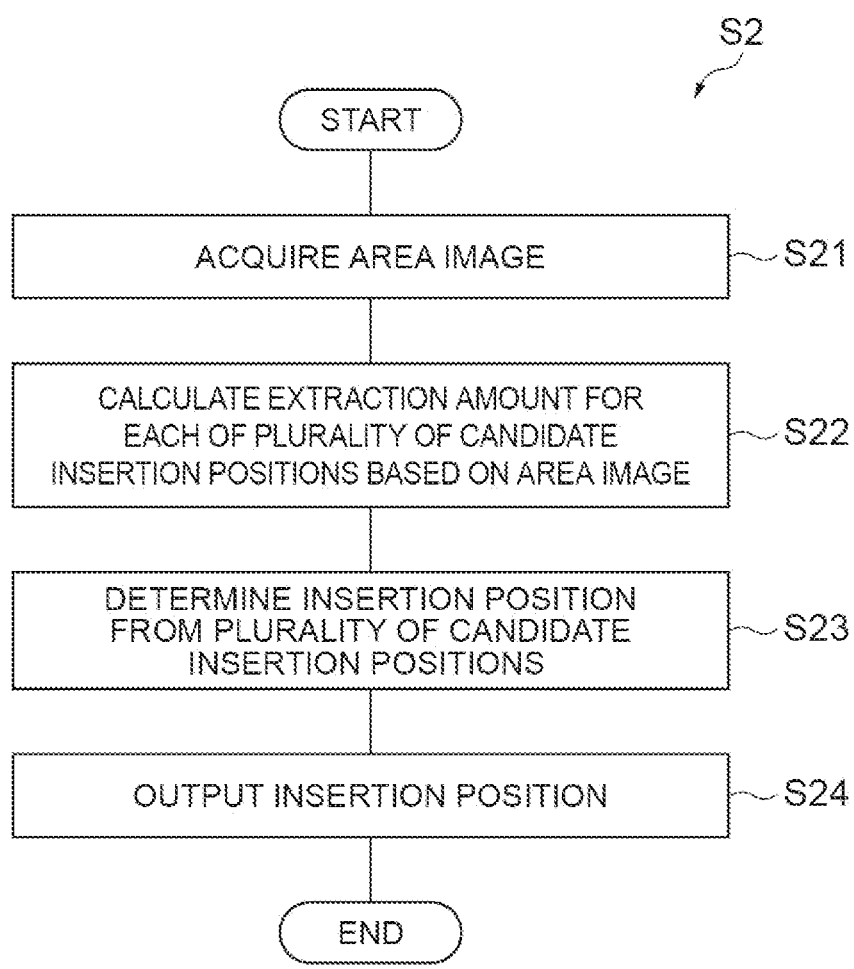
FIG. 10 is a flowchart showing an example of determining an insertion position.

As an example of the support control method according to the present disclosure, the determination of the insertion position of the support into the heap of pieces of material 90 will be described with reference to FIG. 10. FIG. 10 is a flowchart showing an example of processing by the weighing system 2 as a processing flow S2. That is, the weighing system 2 executes the processing flow S2.

In step S21, the insertion position determination unit 31 acquires an area image capturing the heap of pieces of material 90 from the camera 5. The area image captures at least an upper surface (or upper exposed surface) of the heap of pieces of material 90. The area image may be a still image or one frame image constituting a video. In some examples, the insertion position determination unit 31 acquires a depth image capturing the heap of pieces of material 90. Alternatively, the insertion position determination unit 31 may obtain a set of an RGB image and a depth image that capture the heap of pieces of material 90. In a case where the camera 5 takes the area image, the robot control unit 50 controls respective postures of the first robot 3 and the second robot 4 such that the heap of pieces of material 90 is not obstructed by the first robot 3 and the second robot 4.

In step S22, the insertion position determination unit 31 calculates an extraction amount for each of a plurality of candidate insertion positions based on the area image. In some examples, the path setting unit 33 sets a plurality of candidate insertion positions for the heap of pieces of material 90 captured by the area image, and sets a virtual path by simulation for each candidate insertion position. The start point of the virtual path is the candidate insertion position, and the end point of the virtual path is a position of the support 3a at the time when the support 3a leaves the heap of pieces of material 90. For each of a plurality of virtual paths, the amount calculation unit 34 calculates an extraction amount obtained by the support 3a traveling the virtual path.

Figure 11:
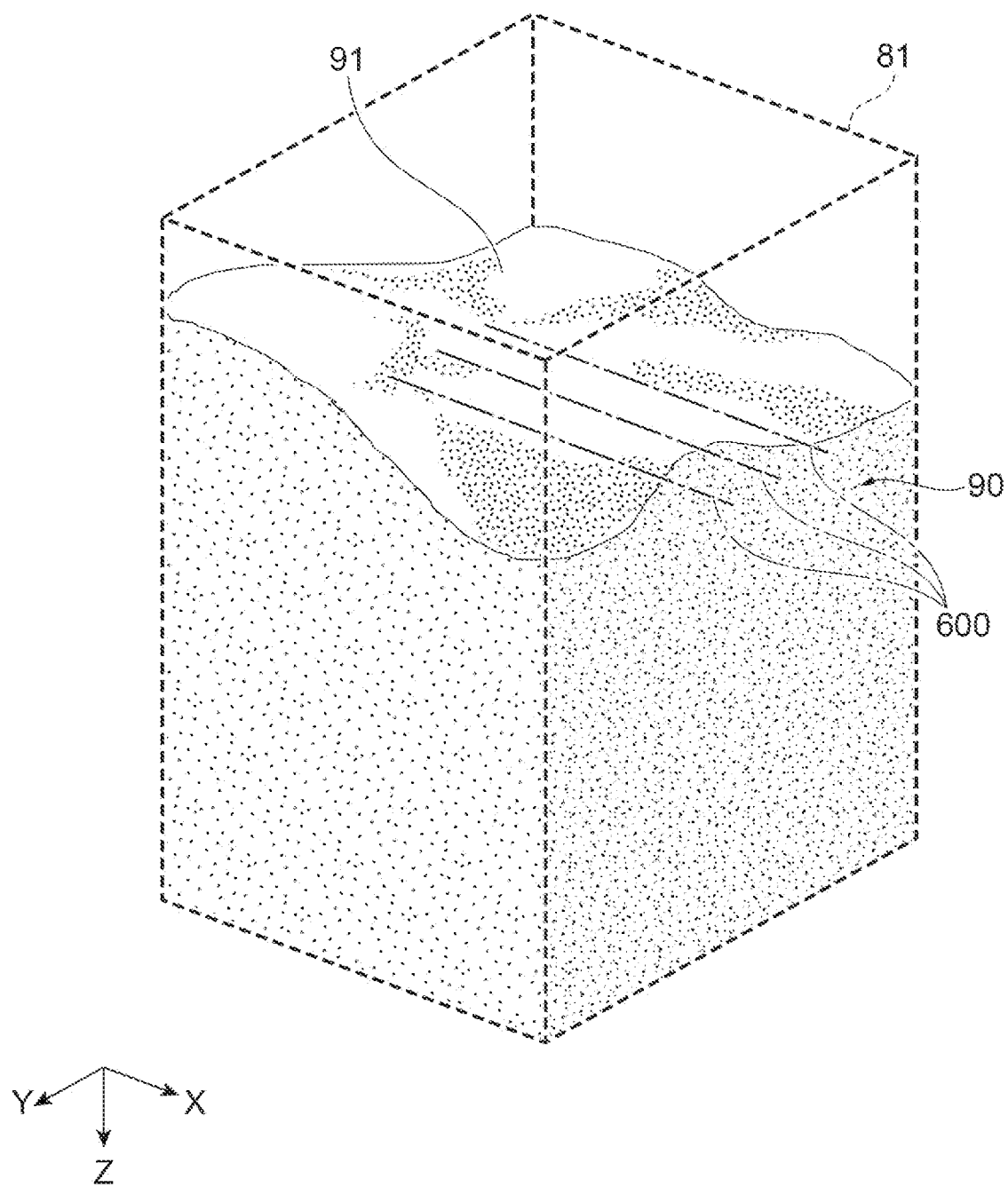
FIG. 11 is a diagram showing an example setting of candidate insertion position.

FIG. 11 is a diagram showing an example setting of the candidate insertion positions. For example, the path setting unit 33 sets a plurality of candidate insertion positions 600 along a coordinate axis (the Y-axis in FIG. 11) corresponding to a direction of movement of the support 3a in a horizontal direction. Alternatively, the path setting unit 33 may set a plurality of candidate insertion positions 600 along two horizontal coordinate axes (the X-axis and the Y-axis in FIG. 11). In some examples, the path setting unit 33 sets a plurality of candidate insertion positions 600 within an area which the support 3a can be inserted to extract a pile of pieces of material, from an area in which the heap of pieces of material 90 are prepared. For example, the path setting unit 33 may set the plurality of candidate insertion positions 600 within an area which allows the support 3a to be inserted into the heap of pieces of material 90 and extract the pile of pieces of material without interfering with the first container 81. The path setting unit 33 may set the candidate insertion positions 600 at a predetermined interval. Alternatively, the shape identification unit 32 may identify the shape of a top surface 91 of the heap of pieces of material 90 based on the area image, and the path setting unit 33 may set the plurality of candidate insertion positions 600 based on the shape. For example, the path setting unit 33 may set the candidate insertion position 600 near a base of a raised portion of the top surface 91 or may set the candidate insertion position 600 in a concave portion of the top surface 91. That is, the path setting unit 33 may set the plurality of candidate insertion positions 600 based on an unevenness of the top surface 91.

Figure 12:
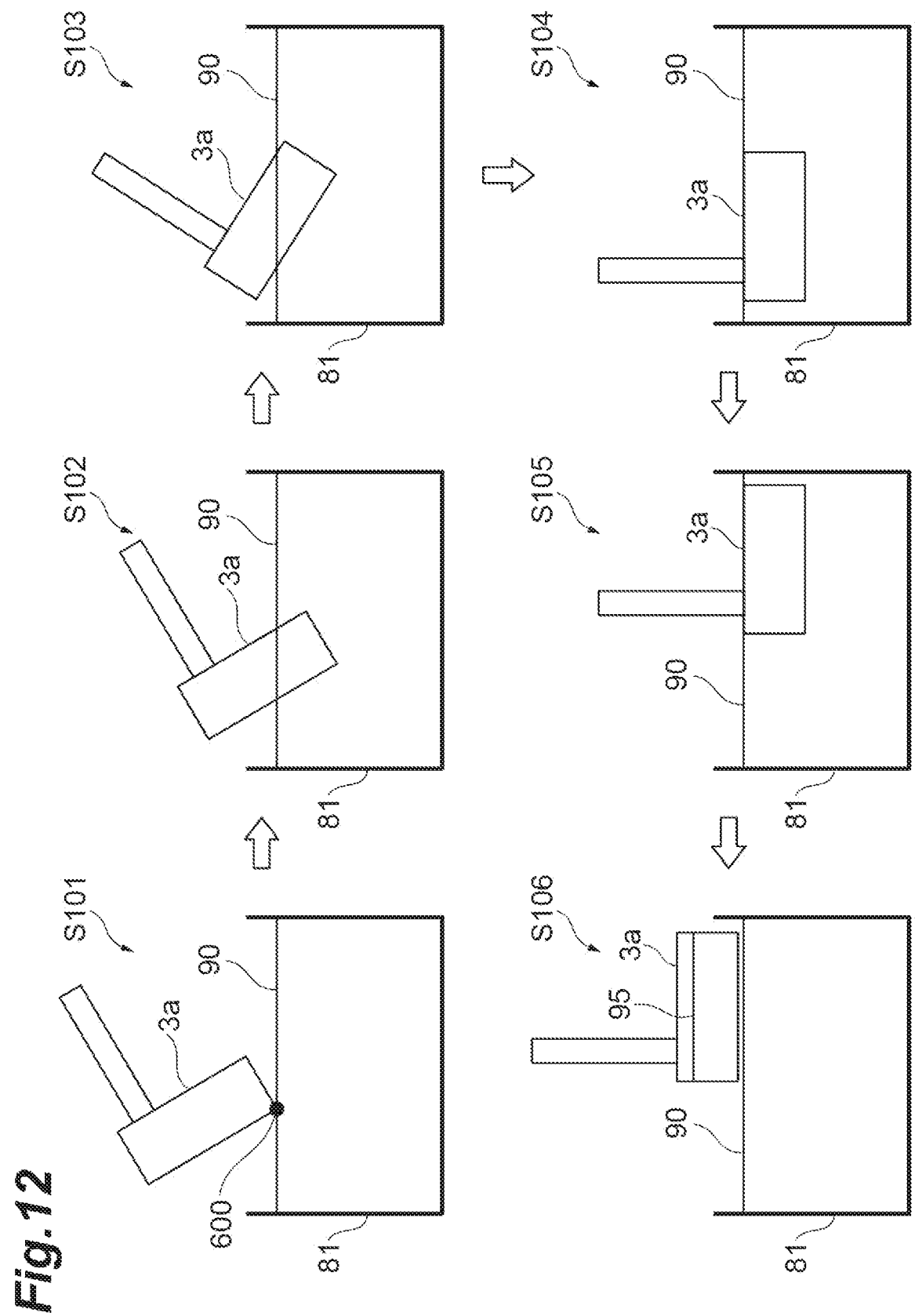
FIG. 12 is a diagram showing an example virtual path.

FIG. 12 is a diagram showing an example virtual path. This figure shows a virtual path of the support 3a that is inserted into the heap of pieces of material 90 from the candidate insertion position 600 and then leaves from the heap of pieces of material 90. In state S101, the tip of the bottom surface of the tilted support 3a contacts the heap of pieces of material 90 at the candidate insertion position 600. In state S102, the support 3a is inserted into the heap of pieces of material 90 along the vertical direction. Subsequently, from state S103 to state S104, the inserted the support 3a is rotated until the bottom surface becomes horizontal, while maintaining the position of the tip of the bottom surface in the vertical direction. In state S105, the horizontal support 3a is moved forward by a predetermined distance. In state S106, the moved support 3a is pulled up above the heap of pieces of material 90. A pile of pieces of material 95 is placed on the lifted support 3a. In some examples, the path setting unit 33 calculates the path of the support 3a moving across states S101-S106 by the geometric calculation. The path setting unit 33 may execute the geometric calculation taking at least one of a size of the support 3a, a tilt angle of the support 3a at the time of insertion, a size of the first container 81, and a spacing between an inner peripheral surface of the first container 81 and an outer peripheral surface of the support 3a into account. The size of the support 3a includes at least one of a length, a width, and a depth. The size of the first container 81 includes at least one of a length, a width, and a depth (or height).

The amount calculation unit 34 calculates, for each of a plurality of virtual paths, an extraction amount obtained by the support 3a traveling the virtual path. This extraction amount corresponds to the candidate insertion position that is the starting point of the virtual path. In some examples, the amount calculation unit 34 calculates an average of distances from the bottom surface of the support 3a to the top surface of the heap of pieces of material 90 on the virtual path (that is, an average height of the top surface of the heap of pieces of material 90 based on the bottom surface of the support 3a), as the extraction amount. Alternatively, the amount calculation unit 34 may calculate the total volume of pieces of material located above the bottom surface of the support 3a on the virtual path, as the extraction amount. Alternatively, the amount calculation unit 34 may calculate, as the extraction amount, a mass obtained from the total volume and a predetermined density of pieces of material. Even in a case where the separation position is determined based on the mass, the extraction amount may be represented by the volume or the average height. For example, in relation to the capacity of the support 3a, a range of a volume or an average height that can be expected to finally obtain the predetermined amount of pieces of material is preset. The amount calculation unit 34 may use the total volume or the average height as the extraction amount based on the setting range.

Referring back to FIG. 10, in step S23, the insertion position determination unit 31 determines an insertion position from the plurality of candidate insertion positions based on the calculated plurality of extraction amounts. In some examples, the insertion position determination unit 31 may determine one candidate insertion position corresponding to an extraction amount capable of finally separating the predetermined amount of pieces of material, as the insertion position. That is, the insertion position determination unit 31 may determine one candidate insertion position corresponding to an extraction amount greater than or equal to the predetermined amount, as the insertion position. For example, the insertion position determination unit 31 may determine a candidate insertion position corresponding to a maximum value among the plurality of calculated extraction amounts, as the insertion position. Alternatively, the insertion position determination unit 31 may determine the insertion position based on a difference between the plurality of calculated extraction amounts and the predetermined amount, for example, may determine the candidate insertion position having the smallest difference as the insertion position.

In step S24, the insertion position determination unit 31 outputs the determined insertion position. In some examples, the insertion position determination unit 31 outputs the insertion position to the robot control unit 50.

Figure 13:
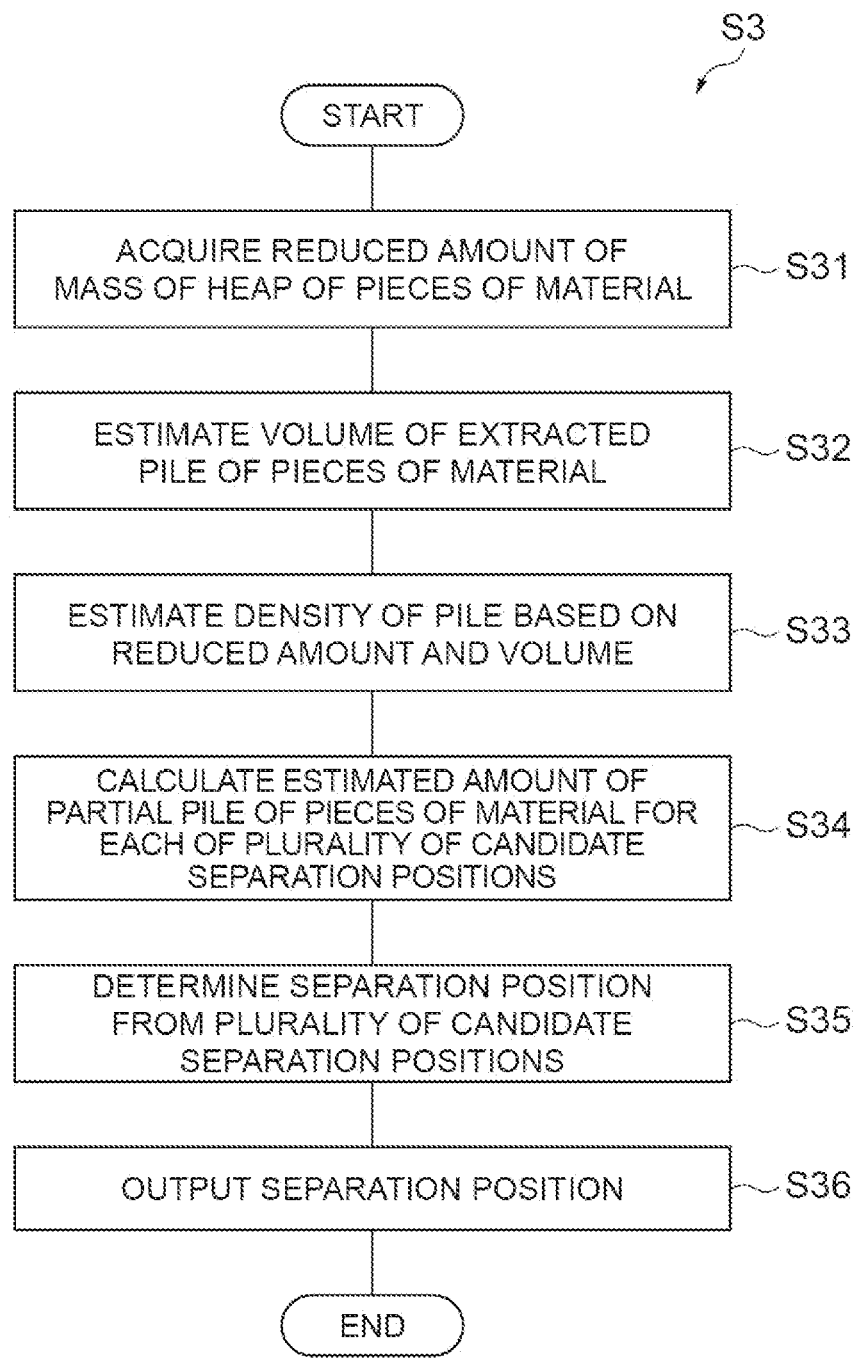
FIG. 13 is a flowchart showing an example of determining a separation position.

As an example of the weighing method according to the present disclosure, determination of a separation position for obtaining the predetermined amount of pieces of material will be described with reference to FIG. 13. FIG. 13 is a flowchart showing an example of the processing as a processing flow S3. The weighing system 2 executes the processing flow S3 after the first robot 3 extracts the pile of pieces of material from the first container 81 with the support 3a based on the insertion position determined by the processing flow S2.

In step S31, the density estimation unit 41 acquires a reduced amount of the mass of the heap of pieces of material 90. The density estimation unit 41 acquires from the weighing instrument 6 the mass of the first container 81 before the pile of pieces of material is extracted and the mass of the first container 81 after the pile is extracted. The density estimation unit 41 then obtains the difference between the two masses as the reduced amount.

In step S32, the density estimation unit 41 estimates the volume of the extracted pile of pieces of material. In some examples, the density estimation unit 41 acquires a pile image taken by the camera 5 and sets a plurality of voxels for the pile of pieces of material captured by the pile image, in a similar manner to step S12 described above. Then, the density estimation unit 41 calculates a volume (i.e., a voxel volume) for each of the plurality of voxels. As described for the example weighing system 1 illustrated in FIG. 1, the voxel volume is represented by $z(x, y)\Delta x \Delta y$. The density estimation unit 41 calculates a sum of the plurality of voxel volumes as the volume of the pile of pieces of material.

In step S33, the density estimation unit 41 estimates a density of the pile of pieces of material based on the reduced amount and the volume.

In step S34, the amount estimation unit 42 calculates an estimated amount of a subset of pieces of material for each of a plurality of candidate separation positions. In some examples, the amount estimation unit 42 calculates the estimated amount (e.g., an estimated mass) for each candidate separation position, in a similar manner to step S14 described above. That is, the amount estimation unit 42 sets the plurality of candidate separation positions, and calculates the estimated amount for each candidate separation position based on the plurality of voxel amounts corresponding to the plurality of voxels. In some examples, the amount estimation unit 42 sets the plurality of candidate separations based on the pile image, identifies, for each of the candidate separation positions, the subset of pieces of material, and calculates the estimated amount of each subset. The amount estimation unit 42 may set a reference position for setting the candidate separation position at the front end or the back end of the support 3a. The amount estimation unit 42 uses the density estimated in step S33 as the voxel density, and thus the voxel densities are the same among the plurality of voxels. The amount estimation unit 42 may calculate the product of the voxel density and the voxel volume as the voxel amount without using the class value. In step S34, the correction unit 43 may correct the estimated amount for each of the plurality of candidate separation positions. This correction is similar to step S14.

In step S35, the separation position determination unit 44 determines a separation position from the plurality of candidate separation positions. This process is similar to step S15 described above. The separation position determination unit 44 may determine a candidate separation position minimizing an error between the estimated amount and the predetermined amount, as the separation position. In the mass-based determination, the separation position determination unit 44 may determine a candidate separation position that minimizes an error between the estimated mass and the predetermined mass, as the separation position.

In step S36, the separation position determination unit 44 outputs the determined separation position. In some examples, the insertion position determination unit 31 outputs the separation position to the robot control unit 50.

With reference to FIG. 14, a series of processes will be described in which the pile of pieces of material is extracted from the heap of pieces of material 90 and the predetermined amount of pieces of material is obtained from the pile. FIG. 14 is a flowchart showing an example of that processing as a processing flow S4. That is, the weighing system 2 executes the processing flow S4.

In step S41, the extraction function 30 of the weighing system 2 determines the insertion position of the support 3a into the heap of pieces of material 90. This process corresponds to the processing flow S2 described above.

In step S42, the robot control unit 50 controls the first robot 3 based on the insertion position to extract the pile of pieces of material from the heap of pieces of material 90. In some examples, the robot control unit 50 generates a path indicating a trajectory of the first robot 3 for inserting the support 3a into the heap of pieces of material 90 from the insertion position to extract the pile of pieces of material. The robot control unit 50 may adopt a virtual path corresponding to the determined insertion position as the path. The robot control unit 50 generates a command signal based on the path and transmits the command signal to the first robot 3. In accordance with the command signal, the first robot 3 inserts the support 3a into the insertion position on the heap of pieces of material 90, advances the support 3a in the heap of pieces of material 90 (e.g., as shown in FIG. 12), and scoops the pile of pieces of material from the heap of pieces of material 90. In some examples, after extracting the pile of pieces of material, the robot control unit 50 controls the second robot 4 to level the top surface of the pile. For example, the robot control unit 50 generates a path indicating a trajectory of the second robot 4 for leveling the top surface of the pile of pieces of material with the separating plate 4a, based on the pile image obtained from the camera 5. The robot control unit 50 generates a command signal based on the path and transmits the command signal to the second robot 4. In accordance with the command signal, the second robot 4 levels the top surface of the pile of pieces of material with the separating plate 4a.

In step S43, the separation function 40 of the weighing system 2 determines the separation position to obtain the predetermined amount of pieces of material. This process corresponds to the processing flow S3 described above.

In step S44, the robot control unit 50 controls the second robot 4 based on the separation position to separate the predetermined amount of pieces of material from the pile of pieces of material. In some examples, the robot control unit 50 generates a path indicating a trajectory of the second robot 4 for inserting the separating plate 4a into the pile of pieces of material at the separation position to separate the pile into a predetermined amount of portion (hereinafter referred to as "designated portion") and a remaining portion. The robot control unit 50 generates a command signal based on the path and transmits the command signal to the second robot 4. In accordance with the command signal, the second robot 4 inserts the separating plate 4a into the separation position on the pile of pieces of material and lowers the separating plate 4a to the bottom surface of the support 3a. The robot control unit 50 further generates a first path indicating a trajectory of the first robot 3 and a second path indicating a trajectory of the second robot 4 in order to transfer the predetermined amount of pieces of material to the second container 82. For example, the robot control unit 50 may generate the first path and the second path in order to realize a series of operations of returning the remaining portion to the first container 81 with the separating plate 4a to leave the designated portion on the support 3a, and transferring the designated portion to the second container 82. Alternatively, for example, the robot control unit 50 may generate the first path and the second path in order to realize a series of operations of transferring the designated portion to the second container 82 with the separating plate 4a and then returning the remaining portion on the support 3a to the first container 81. The robot control unit 50 generates a first command signal based on the first path and transmits the first command signal to the first robot 3. Further, the robot control unit 50 generates a second command signal based on the second path and transmits the second command signal to the second robot 4. The first robot 3 and the second robot 4 cooperate with each other in accordance with these command signals to transfer the predetermined amount of pieces of material to the second container 82.

The processing flow S4 may be repeatedly executed for the heap of pieces of material 90. In this case, pieces of material are transferred from the first container 81 to the second container 82 by the predetermined amount.

It is to be understood that not all aspects, advantages and features described herein may necessarily be achieved by, or included in, any one particular example. Indeed, having described and illustrated various examples herein, it should be apparent that other examples may be modified in arrangement and detail.

The weighing system may estimate the density of the pile of pieces of material and determine the separation position based on the density, without setting a voxel for the pile image.

The weighing system may directly obtain the voxel amount without calculating the voxel density, for each of the plurality of voxels.

The weighing system may determine the separation position based on the density of the pile of pieces of material, without setting the plurality of candidate separation positions. Alternatively, the weighing system may set one candidate separation position, calculate an estimated amount of the pile of pieces of material corresponding to the candidate separation position, and determine the separation position based on the estimated amount.

As described above, the densities of the pieces of material processed by the weighing system or the support control system may be uniform or may vary depending on the location within the pile of pieces of material. In general, examples of pieces of material having a uniform density include granular or powdered food, and examples of pieces of material having different densities include cut food. Regardless of the type of pieces of material, the weighing system may estimate the density of the pieces of material by a method performed by the weighing system 1 illustrated in FIG. 1, or a method performed by the weighing system 2 illustrated in FIG. 9, as described above. In a case where it is assumed that the density of pieces of material is uniform, the weighing system may determine the separation position based on a preset density without estimating the density.

The insertion position determination unit may set one candidate insertion position, calculate an extraction amount corresponding to the candidate insertion position, and determine the insertion position based on the extraction amount. Alternatively, the insertion position determination unit may identify a shape of the top surface of the heap of pieces of material based on the area image and determine the insertion position based on the shape, without setting the candidate insertion position and estimating the extraction amount. For example, the insertion position determination unit may determine, as the insertion position, a position near a base of a raised portion of the top surface of the heap of pieces of material, or may set a concave portion of the top surface as the insertion position. That is, the insertion position determination unit may determine the insertion position based on an unevenness of the top surface.

The extraction function 30 and the separation function 40 in the example weighing system 2 illustrated at FIG. 9, may be provided independently. For example, the extraction function 30 may be provided as the support control system. Alternatively, the separation function 40 may be provided as the weighing system, without including the extraction function 30.

The weighing system may not include the separation position determination unit. In this case, the weighing system estimates the estimated amount of subset of pieces of material as described above with respect to the weighing system 1 illustrated at FIG. 1 and the weighing system 2 illustrated at FIG. 9, and outputs the estimated amount.

The hardware configuration of the weighing system is not limited to an aspect in which each functional module is implemented by executing the program. For example, at least a part of the functional modules described above may be configured by logic circuit specialized for the function, or may be configured by an application specific integrated circuit (ASIC) in which the logic circuits are integrated.

The processing procedure of the method executed by at least one processor is not limited to the above examples. For example, some of the steps or processes described above may be omitted, or the steps may be executed in a different order. In addition, two or more of the above-described steps may be combined, or a part of the steps may be modified or deleted. Alternatively, other steps may be executed in addition to the above-described steps.

In a case where the magnitude relationship between two numerical values is compared in a computer system or a computer, either of two criteria of "equal to or greater than" and "greater than" may be used, and either of two criteria of "equal to or less than" and "less than" may be used.

As described above, a material separation system according to an aspect of the present disclosure includes circuitry configured to: acquire a composite image capturing a plurality of commingled pieces of material; set a number of candidate separation positions based on the composite image; identify, for each of the candidate separation positions, a subset of the plurality of commingled pieces of material; calculate an estimated mass of each subset of the plurality of commingled pieces of material; determine a position for separating a predetermined mass of pieces of material from the plurality of commingled pieces of material, as a separation position, based on a comparison of the predetermined mass with the estimated mass corresponding to each of the candidate separation positions; and separate the predetermined mass of pieces of material from the plurality of commingled pieces of material at the separation position.

A method of material separation according to an aspect of the present disclosure includes: acquiring a composite image capturing a plurality of commingled pieces of material; setting a number of candidate separation positions based on the composite image; identifying, for each of the candidate separation positions, a subset of the plurality of commingled pieces of material; calculating an estimated mass of each subset of the plurality of commingled pieces of material; determining a position for separating a predetermined mass of pieces of material from the plurality of commingled pieces of material, as a separation position, based on a comparison of the predetermined mass with the estimated mass corresponding to each of the candidate separation positions; and separating the predetermined mass of pieces of material from the plurality of commingled pieces of material at the separation position.

A non-transitory computer-readable storage medium according to an aspect of the present disclosure stores processor-executable instructions to: acquire a composite image capturing a plurality of commingled pieces of material; set a number of candidate separation positions based on the composite image; identify, for each of the candidate separation positions, a subset of the plurality of commingled pieces of material; calculate an estimated mass of each subset of the plurality of commingled pieces of material; determine a position for separating a predetermined mass of pieces of material from the plurality of commingled pieces of material, as a separation position, based on a comparison of the predetermined mass with the estimated mass corresponding to each of the candidate separation positions; and separate the predetermined mass of pieces of material from the plurality of commingled pieces of material at the separation position.

According to such examples, the estimated mass at each candidate separation position is calculated based on the composite image, and the separation position is determined based on the estimated mass. Thus, a predetermined mass of pieces of material may be identified.

In some examples, the circuitry may be configured to: acquire an image of stored material including the plurality of commingled pieces of material; determine, based on the image of stored material, an insertion position of a material extraction apparatus for extracting the plurality of commingled pieces of material having a mass equal to or greater than the predetermined mass; extract, with the material extraction apparatus, the plurality of commingled pieces of material from the stored material based on the insertion position, wherein the composite image is acquired after extracting the plurality of commingled pieces of material. In this case, the insertion position of the material extraction apparatus for extracting the predetermined mass or more of the pieces of material from the stored material is determined based on the image of the stored material. This process enables a reliable extraction that will ultimately obtain the predetermined mass of pieces of material, from the stored material.

In some examples, the circuitry may be configured to: set a virtual path of the material extraction apparatus through the stored material; calculate a mass of the plurality of commingled pieces of material extracted by the material extraction apparatus passing through the virtual path, as an extraction mass; and determine the insertion position based on the extraction mass. In this case, since the insertion position is determined in consideration of the path of the material extraction apparatus in the stored material and the extraction mass corresponding to the path, the predetermined mass or more of the commingled pieces of material may be extracted from the stored material more reliably.

In some examples, the circuitry may be configured to calculate the extraction mass based on: an average of distances from a bottom surface of the material extraction apparatus to a top surface of the stored material, on the virtual path; or a total volume of pieces of material positioned above the bottom surface of the material extraction apparatus, on the virtual path.

In some examples, the circuitry may be configured to: identify a shape of a top surface of the stored material based on the image of stored material; and determine the insertion position based on the shape of the top surface. In this case, since the insertion position is determined based on the shape of the top surface of the stored material, the insertion position may be appropriately determined in accordance with a situation of the stored material.

In some examples, the circuitry may be configured to: set a plurality of voxels for the plurality of commingled pieces of material captured in the composite image; estimate, for each of the plurality of voxels, a mass of the pieces of material corresponding to the voxel as a voxel mass; and calculate the estimated mass based on the voxel mass of each of the plurality of voxels. In this case, the plurality of voxels is set for the composite image, and the mass in each voxel is estimated. This process allows the predetermined mass of pieces of material to be identified even if the distribution of the plurality of commingled pieces of material is uneven.

In some examples, the circuitry may be configured to determine the separation position based on which of the candidate separation positions minimizes an error between the estimated mass and the predetermined mass. In this case, for each of the plurality of candidate separation positions, the estimated mass of pieces of material to be separated is compared with the predetermined mass, and the candidate separation position having a minimum error between the both masses is determined as the separation position. Thus, the predetermined mass of pieces of material may be more reliably identified.

In some examples, the circuitry may be configured to: set the candidate separation positions along one coordinate axis of a coordinate system indicating a real space in which the plurality of commingled pieces of material is located; and determine the separation position from the candidate separation positions. In this case, since the plurality of candidate separation positions is set along one coordinate axis, the setting of the candidate separation positions is simplified, and the separation position may be easily determined accordingly.

In some examples, the circuitry may be configured to: estimate a density of the plurality of commingled pieces of material based on the composite image; and calculate the estimated mass based on the density and a volume of the subset. In this case, the density of the commingled pieces of material is estimated based on the composite image, and the estimated mass is calculated based on the density and the volume of the subset. Therefore, the estimated mass of the subset may be calculated more accurately.

In some examples, the composite image may be a depth image, and the circuitry may be configured to calculate the volume based on a distance in a depth direction obtained from the depth image. In this case, since the volume may be calculated with high accuracy by using the depth image, the accuracy of calculation of the estimated mass may be improved accordingly.

In some examples, the circuitry may be configured to estimate the density based on a reduced mass of stored material accumulated in a predetermined area when the plurality of commingled pieces of material is extracted from the stored material, and a volume of the extracted pieces of material. In this case, by using the reduced mass of the stored material when the plurality of commingled pieces of material is extracted, as the mass of the plurality of commingled pieces of material, it is not necessary to actually measure the mass of the plurality of commingled pieces of material. Accordingly, the estimated mass of the plurality of commingled pieces of material may be easily obtained.

In some examples, the circuitry may be configured to: set a plurality of voxels for the plurality of commingled pieces of material captured in the composite image; calculate, for each of the plurality of voxels, a density of the pieces of material in the voxel as a voxel density; calculate, for each of the plurality of voxels, a mass of the pieces of material in the voxel as a voxel mass based on the voxel density; and calculate the estimated mass based on the voxel mass of each of the plurality of voxels. In this case, the plurality of voxels is set for the composite image, and the densities and masses of pieces of material in the individual voxels are obtained, so that the separation position may be accurately determined even in a case where a density of the plurality of commingled pieces of material is uneven.

In some examples, the circuitry may be configured to calculate the voxel density for each of the plurality of voxels using a machine learning model that receives an input of the composite image and outputs the voxel density. In this case, by using machine learning, the voxel density may be accurately obtained, adapting to various distributions of pieces of material.

In some examples, the circuitry may be configured to execute the machine learning based on an error between the estimated mass of the subset and a ground truth corresponding to the estimated mass to generate the machine learning model. In this case, the machine learning model that outputs the voxel density is learned based on the estimated mass of the subset instead of a value for each voxel, thereby reducing the load of learning.

In some examples, the circuitry may be configured to: estimate, for each of the plurality of voxels, a class value indicating whether the pieces of material are present in the voxel; and calculate, for each of the plurality of voxels, the voxel mass based on the class value and the voxel density. In this case, by considering the presence or absence of pieces of material in each voxel, the estimated mass of pieces of material to be separated may be accurately calculated by excluding a voxel that should not be considered. Therefore, the accuracy of the separation position may be further improved.

In some examples, the circuitry may be configured to calculate the class value for each of the plurality of voxels using a machine learning model that receives an input of the composite image and outputs the class value. In this case, by using the machine learning, the class values may be accurately obtained for various distributions of pieces of material.

In some examples, the circuitry may be configured to: correct the estimated mass based on a relationship between samples of the estimated mass that were previously calculated and samples of an actual mass of the pieces of material that were previously separated at the separation position corresponding to the estimated mass; and determine the separation position based on the corrected estimated mass. In this case, since the calculated estimated mass is corrected based on the relationship between the estimated mass and the actual mass obtained in the past, the accuracy of the separation position may be further improved.

In some examples, the circuitry may be configured to: execute a regression analysis based on the samples of the estimated mass and the samples of the actual mass to calculate a linear formula indicating a relationship between the estimated mass and the actual mass; calculate a correction coefficient for converting the calculated linear formula into an ideal linear formula in which the actual mass is regarded as a true value; and correct the estimated mass based on the correction coefficient.

We claim all modifications and variations coming within the spirit and scope of the subject matter claimed herein.

The following appendices are provided by way of further illustrative examples.

(Appendix 1) A weighing system comprising:
an amount estimation unit configured to calculate, for each of at least one candidate separation position, based on a pile image capturing a pile of pieces of material managed by mass, an estimated amount of a subset of the pieces of material obtained by separating the pile at the candidate separation position; and
a separation position determination unit configured to determine a position for separating a predetermined amount of pieces of material from the pile, as a separation position, based on at least one of the estimated amount.

(Appendix 2) The weighing system according to Appendix 1, further comprising an insertion position determination unit configured to determine, based on an area image capturing a heap of pieces of material accumulated in a predetermined area, an insertion position of a support for extracting the pile equal to or greater than the predetermined amount from the heap of pieces of material,
wherein the amount estimation unit is configured to calculate the estimated amount for each of the at least one candidate separation position based on the pile image capturing the pile extracted by the support inserted into the heap of pieces of material from the insertion position.

(Appendix 3) The weighing system according to Appendix 2, wherein the insertion position determination unit is configured to:
set a virtual path of the support through the heap of pieces of material;
calculate an amount of the pile extracted by the support passing through the virtual path, as an extraction amount; and
determine the insertion position based on the extraction amount.

(Appendix 4) The weighing system according to Appendix 2 or 3, wherein the insertion position determination unit is configured to:
identify a shape of a top surface of the heap of pieces of material based on the area image; and
determine the insertion position based on the shape of the top surface.

(Appendix 5) The weighing system according to any one of Appendices 1 to 4, further comprising an image processing unit configured to set a plurality of voxels for the pile captured in the pile image,
wherein the amount estimation unit is configured to:
estimate, for each of the plurality of voxels, an amount of the pieces of material corresponding to the voxel as a voxel amount; and
calculate the estimated amount based on a plurality of the voxel amounts.

(Appendix 6) The weighing system according to any one of Appendices 1 to 5,
wherein the at least one candidate separation position includes a plurality of candidate separation positions, and
the separation position determination unit is configured to determine, from the plurality of candidate separation positions, the candidate separation position that minimizes an error between the estimated amount and the predetermined amount, as the separation position.

(Appendix 7) The weighing system according to Appendix 6,
wherein the amount estimation unit is configured to set the plurality of candidate separation positions along one coordinate axis of a coordinate system indicating a real space in which the pile is located, and
wherein the separation position determination unit is configured to determine the separation position from the plurality of candidate separation positions.

(Appendix 8) The weighing system according to any one of Appendices 1 to 7, further comprising a density estimation unit configured to estimate a density of the pile based on the pile image,
wherein the amount estimation unit is configured to calculate the estimated amount based on the density and a volume of the subset.

(Appendix 9) The weighing system according to Appendix 8,
wherein the pile image is a depth image, and
wherein the amount estimation unit is configured to calculate the volume based on a distance in a depth direction obtained from the depth image.

(Appendix 10) The weighing system according to Appendix 8 or 9, wherein the density estimation unit is configured to estimate the density based on a reduced amount of a mass of a heap of pieces of material accumulated in a predetermined area when the pile is extracted from the heap of pieces of material, and a volume of the extracted pile.

(Appendix 11) The weighing system according to Appendix 8, further comprising an image processing unit configured to set a plurality of voxels for the pile captured in the pile image, wherein the density estimation unit is configured to calculate, for each of the plurality of voxels, a density of the pieces of material in the voxel as a voxel density, and wherein the amount estimation unit is configured to:
calculate, for each of the plurality of voxels, an amount of the pieces of material in the voxel as a voxel amount based on the voxel density; and
calculate the estimated amount based on a plurality of the voxel amounts.

(Appendix 12) The weighing system according to Appendix 11, wherein the density estimation unit is configured to calculate the voxel density for each of the plurality of voxels using a machine learning model that receives an input of the pile image and outputs the voxel density.

(Appendix 13) The weighing system according to Appendix 12, further comprising a learning unit configured to execute machine learning based on an error between an estimated amount of the subset and a ground truth corresponding to the estimated amount to generate the machine learning model.

(Appendix 14) The weighing system according to Appendix 11,
wherein the density estimation unit is configured to estimate, for each of the plurality of voxels, a class value indicating whether the pieces of material are present in the voxel, and
wherein the amount estimation unit is configured to calculate, for each of the plurality of voxels, the voxel amount based on the class value and the voxel density.

(Appendix 15) The weighing system according to Appendix 14, wherein the density estimation unit is configured to calculate the class value for each of the plurality of voxels using a machine learning model that receives an input of the pile image and outputs the class value.

(Appendix 16) The weighing system according to any one of Appendices 1 to 15, further comprising a correction unit configured to correct the estimated amount based on a relationship between samples of the estimated amount calculated by the amount estimation unit in the past and samples of an actual amount of the pieces of material actually separated in the past at the separation position corresponding to the estimated amount,
wherein the separation position determination unit is configured to determine the separation position based on a plurality of estimated amounts corrected.

(Appendix 17) A support control system comprising:
a path setting unit configured to set, based on an area image capturing a heap of pieces of material that is managed by a weight and accumulated in a predetermined area, a virtual path of a support passing through the heap of pieces of material;
an insertion position determination unit configured to determine an insertion position of the support for extracting a pile of pieces of material managed by a mass from the heap of pieces of material, based on the virtual path.

(Appendix 18) A weighing system comprising:
an image processing unit configured to set, based on a pile image capturing a pile of pieces of material managed by mass, a plurality of voxels for the pile;
a density estimation unit configured to calculate, for each of the plurality of voxels, a density of the pieces of material in the voxel as a voxel density;
a voxel amount calculation unit configured to calculate, for each of the plurality of voxels, an amount of the pieces of material in the voxel as a voxel amount based on the voxel density; and
an amount estimation unit configured to calculate an estimated amount of a subset of the pieces of material obtained by separating the pile, based on a plurality of the voxel amounts.

(Appendix 19) A weighing method executed by a weighing system comprising at least one processor, the method comprising:
calculating, for each of at least one candidate separation position, based on a pile image capturing a pile of pieces of material managed by mass, an estimated amount of a subset of the pieces of material obtained by separating the pile at the candidate separation position; and
determining a position for separating a predetermined amount of pieces of material from the pile, as a separation position, based on at least one of the estimated amount.

(Appendix 20) A weighing program causing a computer to execute:
calculating, for each of at least one candidate separation position, based on a pile image capturing a pile of pieces of material managed by mass, an estimated amount of a subset of the pieces of material obtained by separating the pile at the candidate separation position; and
determining a position for separating a predetermined amount of pieces of material from the pile, as a separation position, based on at least one of the estimated amount.

According to Appendices 1, 19 and 20, the estimated amount at each candidate separation position is calculated based on the pile image, and the separation position is determined based on the estimated amount. Thus, a predetermined amount of pieces of material may be identified.

According to Appendix 2, the insertion position of the support for extracting the predetermined amount or more of the pile of pieces of material from the heap of pieces of material is determined based on the area image capturing the heap of pieces of material. This process enables a reliable extraction of a pile that will ultimately obtain the predetermined amount of pieces of material, from the heap of pieces of material.

According to Appendix 3, since the insertion position is determined in consideration of the path of the support in the heap of pieces of material and the extraction amount corresponding to the path, the predetermined amount or more of the pile of pieces of material may be extracted from the heap of pieces of material more reliably.

According to Appendix 4, since the insertion position is determined based on the shape of the top surface of the heap of pieces of material, the insertion position may be appropriately determined in accordance with a situation of the heap of pieces of material.

According to Appendix 5, the plurality of voxels is set for the pile image, and the amount in each voxel is estimated. This process allows the predetermined amount of pieces of material to be identified even if the distribution of pieces of material in the pile is uneven.

According to Appendix 6, for each of the plurality of candidate separation positions, the estimated amount of pieces of material to be separated is compared with the predetermined amount, and the candidate separation position having a minimum error between the both amounts is determined as the separation position. Thus, the predetermined amount of pieces of material may be more reliably identified.

According to Appendix 7, since the plurality of candidate separation positions is set along one coordinate axis, the setting of the candidate separation positions is simplified, and the separation position may be easily determined accordingly.

According to Appendix 8, the density of the pile of pieces of material is estimated based on the pile image, and the estimated amount is calculated based on the density and the volume of the subset. Therefore, the estimated amount of the subset may be calculated more accurately.

According to Appendix 9, since the volume may be calculated with high accuracy by using the depth image, the accuracy of calculation of the estimated amount may be improved accordingly.

According to Appendix 10, by using the reduced amount of the mass of the heap of pieces of material when the pile of pieces of material is extracted, as the mass of the pile, it is not necessary to actually measure the mass of the pile. Accordingly, the estimated amount of the pile of pieces of material may be easily obtained.

According to Appendix 11, the plurality of voxels is set for the pile image, and the densities and amounts of pieces of material in the individual voxels are obtained, so that the separation position may be accurately determined even in a case where a density of pieces of material in a pile is uneven.

According to Appendix 12, by using machine learning, the voxel density may be accurately obtained, adapting to various distributions of pieces of material.

According to Appendix 13, the machine learning model that outputs the voxel density is learned based on the estimated amount of the subset instead of a value for each voxel, thereby reducing the load of learning.

According to Appendix 14, by considering the presence or absence of pieces of material in each voxel, the estimated amount of pieces of material to be separated may be accurately calculated by excluding a voxel that should not be considered. Therefore, the accuracy of the separation position may be further improved.

According to Appendix 15, by using the machine learning, the class values may be accurately obtained for various distributions of pieces of material.

According to Appendix 16, since the calculated estimated amount is corrected based on the relationship between the estimated amount and the actual amount obtained in the past, the accuracy of the separation position may be further improved.

According to Appendix 17, since the insertion position is determined in consideration of the path of the support in the heap of pieces of material, the insertion position of the support for extracting the pile of pieces of material may be appropriately determined.

According to Appendix 18, the plurality of voxels is set for the pile image, and the densities and amounts of pieces of material in the individual voxels are calculated. This processing allows the estimated amount of the pile of pieces of material to be accurately calculated even in a case where the density in the pile is uneven.

The following appendices are further provided by way of further illustrative examples.

(Appendix 1) A weighing system comprising:
a density estimation unit configured to estimate, based on an image capturing a pile of pieces of material managed by mass, a density of the pile; and
a determination unit configured to determine a position for separating a predetermined amount of pieces of material from the pile, as a separation position, based on the density.

(Appendix 2) The weighing system according to Appendix 1, further comprising an amount estimation unit configured to calculate, for each of a plurality of candidate positions that are candidates for the separation position, an estimated amount of a subset of the pieces of material obtained by separating the pile at the candidate position, based on the density,
wherein the determining unit is configured to determine, as the separation position, the candidate position that minimizes an error between the estimated amount and the predetermined amount, from the plurality of candidate positions.

(Appendix 3) A weighing system according to Appendix 2,
wherein the amount estimation unit is configured to set the plurality of candidate positions along one coordinate axis of a coordinate system indicating a real space in which the pile is located, and
wherein the determination unit is configured to determine the separation position from the plurality of candidate positions.

(Appendix 4) The weighing system according to Appendix 2 or 3,
wherein the amount estimation unit is configured to calculate an estimated mass of the subset based on the density and a volume of the subset, as the estimated amount, and
the determination unit is configured to determine, as the separation position, the candidate position that minimizes the error between the estimated mass and a predetermined mass.

(Appendix 5) The weighing system according to Appendix 4,
where the image is a depth image, and
wherein the amount estimation unit is configured to calculate the volume based on a distance in a depth direction obtained from the depth image.

(Appendix 6) The weighing system according to any one of Appendices 2 to 5, further comprising an image processing unit configured to set a plurality of voxels for the pile captured in the image,
wherein the amount estimation unit is configured to:
calculate, for each of the plurality of voxels, an amount of the pieces of material in the voxel as a voxel amount; and
calculate the estimated amount of the subset based on the voxel amount of each of the plurality of voxels.

(Appendix 7) The weighing system according to Appendix 6,
wherein the density estimation unit is configured to calculate, for each of the plurality of voxels, a density of the pieces of material in the voxel as a voxel density, and
wherein the amount estimation unit is configured to calculate the voxel amount based on the voxel density for each of the plurality of voxels.

(Appendix 8) The weighing system according to Appendix 7, wherein the density estimation unit is configured to use a machine learning model that receives an input of the image and outputs the voxel density to calculate the voxel density for each of the plurality of voxels.

(Appendix 9) The weighing system according to Appendix 8, further comprising a learning unit configured to execute machine learning based on an error between an estimated amount of the subset and ground truth corresponding to the estimated amount to generate the machine learning model.

(Appendix 10) The weighing system according to any one of Appendices 7 to 9,
wherein the density estimation unit is configured to estimate, for each of the plurality of voxels, a class value indicating whether the pieces of material are present in the voxel, and
wherein the amount estimation unit is configured to calculate the voxel amount based on the class value and the voxel density for each of the plurality of voxels.

(Appendix 11) The weighing system according to Appendix 10, wherein the density estimation unit is configured to use a machine learning model that receives an input of the image and outputs the class value to calculate the class value for each of the plurality of voxels.

(Appendix 12) The weighing system according to any one of Appendices 2 to 11, further comprising a correction unit configured to correct the estimated amount based on a relationship between samples of the estimated amount calculated in the past by the amount estimation unit and samples of an actual amount of the pieces of material actually separated in the past at the separation position corresponding to the estimated amount,
wherein the determining unit is configured to determine the candidate position that minimizes an error between the corrected estimated amount and the predetermined amount, as the separation position.

(Appendix 13) The weighing system comprising:
an image processing unit configured to set, based on an image capturing a pile of pieces of material managed by mass, a plurality of voxels for the pile;
an amount estimation unit configured to estimate, for each of the plurality of voxels, an amount of the pieces of material corresponding to the voxel; and
a determination unit configured to determine a position for separating a predetermined amount of the pieces of material from the pile, as a separation position, based on the estimated amount of each of the plurality of voxels.

(Appendix 14) The weighing system according to any one of Appendices 1 to 13,
wherein the pieces of material are quantitatively-managed food, and
wherein the determination unit is configured to determine the separation position for adding the predetermined amount of the food to a predetermined food item.

(Appendix 15) A weighing method executed by a weighing system comprising at least one processor, the method comprising:
estimating, based on an image capturing a pile of pieces of material managed by mass, a density of the pile; and
determining a position for separating a predetermined amount of pieces of material from the pile, as a separation position, based on the density.

(Appendix 16) A weighing program causing a computer to execute:
estimating, based on an image capturing a pile of pieces of material managed by mass, a density of the pile; and
determining a position for separating a predetermined amount of pieces of material from the pile, as a separation position, based on the density.

(Appendix 17) A weighing method executed by a weighing system comprising at least one processor, the method comprising:
setting, based on an image of a pile of pieces of material managed by mass, a plurality of voxels for the pile;
estimating, for each of the plurality of voxels, an amount of the pieces of material corresponding to the voxel; and
determining a position for separating a predetermined amount of the pieces of material from the pile, as a separation position, based on the estimated amount of each of the plurality of voxels.

(Appendix 18) A weighing program causing a computer to execute:
setting, based on an image of a pile of pieces of material managed by mass, a plurality of voxels for the pile;
estimating, for each of the plurality of voxels, an amount of the pieces of material corresponding to the voxel; and
determining a position for separating a predetermined amount of the pieces of material from the pile, as a separation position, based on the estimated amount of each of the plurality of voxels.

According to Appendices 1, 15 and 16, the density of the pile of pieces of material is estimated based on the image, and the separation positions are determined based on the density. Thus, the predetermined amount of pieces of material may be identified.

According to Appendix 2, for each of a plurality of candidate positions, the estimated amount of pieces of material to be separated is compared with the predetermined amount, and a candidate position having a minimum error between the amounts is determined as the separation position. Thus, the predetermined amount of pieces of material may be more reliably identified.

According to Appendix 3, since the plurality of candidate positions is set along one coordinate axis, the setting of the candidate positions becomes simple, and the separation position may be easily determined accordingly.

According to Appendix 4, since the separation position is set based on the mass, the separation position may be accurately determined in accordance with the properties of pieces of material.

According to Appendix 5, the volume may be accurately calculated by using the depth image, the accuracy of calculation of mass may be improved accordingly.

According to Appendix 6, the plurality of voxels is set for the image and the voxel amount in each voxel is obtained, so that the separation position may be accurately determined even in a case where the distribution of pieces of material in a pile is uneven.

According to Appendix 7, the voxel amount may be accurately calculated in consideration of the voxel density, and the separation position may be accurately determined accordingly.

According to Appendix 8, by using the machine learning, the voxel density may be accurately obtained, adapting to various distributions of pieces of material.

According to Appendix 9, the machine learning model that outputs the voxel density is learned based on the estimated amount of the subset instead of a value for each voxel, thereby reducing the load of learning.

According to Appendix 10, by considering the presence or absence of pieces of material in each voxel, the estimated amount of pieces of material to be separated may be accurately calculated by excluding a voxel that should not be considered. Therefore, the accuracy of the separation position may be further improved.

According to Appendix 11, the class value may be accurately obtained for various distributions of pieces of material by using the machine learning.

According to Appendix 12, since the calculated estimated amount is corrected based on the relationship between the estimated amount and the actual amount obtained in the past, the accuracy of the separation position may be further improved.

According to Appendices 13, 17 and 18, the plurality of voxels is set for the image, the amounts in individual voxels are estimated, and the separation position is determined based on these amounts. This process allows the predetermined amount of pieces of material to be identified even in a case where the distribution of pieces of material in the pile is uneven.

According to Appendix 14, the predetermined amount of food may be identified, which in turn allows the food item to be manufactured more easily.

What is claimed is:

1. A material separation system comprising circuitry configured to:
   acquire a composite image capturing a plurality of commingled pieces of material;
   set a plurality of voxels for the plurality of commingled pieces of material captured in the composite image;
   estimate, for each of the plurality of voxels, a mass of the pieces of material corresponding to the voxel, as a voxel mass;
   set a number of candidate separation positions based on the composite image;
   identify, for each of the candidate separation positions, a subset of the plurality of commingled pieces of material;
   calculate an estimated mass of each subset of the plurality of commingled pieces of material, based on the voxel mass of each of the plurality of voxels;
   determine a position for separating a predetermined mass of pieces of material from the plurality of commingled pieces of material, as a separation position, based on a comparison of the predetermined mass with the estimated mass corresponding to each of the candidate separation positions; and
   separate the predetermined mass of pieces of material from the plurality of commingled pieces of material at the separation position.

2. The system according to claim 1, wherein the circuitry is configured to:
   acquire an image of stored material including the plurality of commingled pieces of material;
   determine, based on the image of stored material, an insertion position of a material extraction apparatus for extracting the plurality of commingled pieces of material having a mass equal to or greater than the predetermined mass; and
   extract, with the material extraction apparatus, the plurality of commingled pieces of material from the stored material based on the insertion position, wherein the composite image is acquired after extracting the plurality of commingled pieces of material.

3. The system according to claim 2, wherein the circuitry is configured to:
   set a virtual path of the material extraction apparatus through the stored material;
   calculate a mass of the plurality of commingled pieces of material extracted by the material extraction apparatus passing through the virtual path, as an extraction mass; and
   determine the insertion position based on the extraction mass.

4. The system according to claim 3, wherein the circuitry is configured to calculate the extraction mass based on:
   an average of distances from a bottom surface of the material extraction apparatus to a top surface of the stored material, on the virtual path; or
   a total volume of pieces of material positioned above the bottom surface of the material extraction apparatus, on the virtual path.

5. The system according to claim 2, wherein the circuitry is configured to:
   identify a shape of a top surface of the stored material based on the image of stored material; and
   determine the insertion position based on the shape of the top surface.

6. The system according to claim 1, wherein the circuitry is configured to determine the separation position based on which of the candidate separation positions minimizes an error between the estimated mass and the predetermined mass.

7. The system according to claim 6, wherein the circuitry is configured to:
   set the candidate separation positions along one coordinate axis of a coordinate system indicating a real space in which the plurality of commingled pieces of material is located; and
   determine the separation position from the candidate separation positions.

8. The system according to claim 1, wherein the circuitry is configured to:
   correct the estimated mass based on a relationship between samples of the estimated mass that were previously calculated, and samples of an actual mass of the pieces of material that were previously separated at the separation position corresponding to the estimated mass; and
   determine the separation position based on the corrected estimated mass.

9. The system according to claim 8, wherein the circuitry is configured to:
   execute a regression analysis based on the samples of the estimated mass and the samples of the actual mass to calculate a linear formula indicating a relationship between the estimated mass and the actual mass;
   calculate a correction coefficient for converting the calculated linear formula into an ideal linear formula in which the actual mass is regarded as a true value; and
   correct the estimated mass based on the correction coefficient.

10. A material separation system comprising circuitry configured to:
    acquire a composite image capturing a plurality of commingled pieces of material;
    estimate a density of the plurality of commingled pieces of material based on the composite image;
    set a number of candidate separation positions based on the composite image;
    identify, for each of the candidate separation positions, a subset of the plurality of commingled pieces of material;
    calculate an estimated mass of each subset of the plurality of commingled pieces of material, based on the density and a volume of the subset;
    determine a position for separating a predetermined mass of pieces of material from the plurality of commingled pieces of material, as a separation position, based on a comparison of the predetermined mass with the estimated mass corresponding to each of the candidate separation positions; and separate the predetermined mass of pieces of material from the plurality of commingled pieces of material at the separation position.

11. The system according to claim 10,
wherein the composite image is a depth image, and
wherein the circuitry is configured to calculate the volume based on a distance in a depth direction obtained from the depth image.

12. The system according to claim 10, wherein the circuitry is configured to estimate the density based on a reduced mass of stored material accumulated in a predetermined area when the plurality of commingled pieces of material is extracted from the stored material, and a volume of the extracted pieces of material.

13. The system according to claim 10, wherein the circuitry is configured to:
set a plurality of voxels for the plurality of commingled pieces of material captured in the composite image;
calculate, for each of the plurality of voxels, a density of the pieces of material in the voxel as a voxel density;
calculate, for each of the plurality of voxels, a mass of the pieces of material in the voxel, as a voxel mass, based on the voxel density; and
calculate the estimated mass based on the voxel mass of each of the plurality of voxels.

14. The system according to claim 13, wherein the circuitry is configured to calculate the voxel density for each of the plurality of voxels using a machine learning model that receives an input of the composite image and outputs the voxel density.

15. The system of claim 14, wherein the circuitry is configured to execute the machine learning based on an error between the estimated mass of the subset and a ground truth corresponding to the estimated mass to generate the machine learning model.

16. The system according to claim 13, wherein the circuitry is configured to:
estimate, for each of the plurality of voxels, a class value indicating whether the pieces of material are present in the voxel; and
calculate, for each of the plurality of voxels, the voxel mass based on the class value and the voxel density.

17. The system according to claim 16, wherein the circuitry is configured to calculate the class value for each of the plurality of voxels using a machine learning model that receives an input of the composite image and outputs the class value.

18. The system according to claim 10, wherein the circuitry is configured to:
acquire an image of stored material including the plurality of commingled pieces of material;
determine, based on the image of stored material, an insertion position of a material extraction apparatus for extracting the plurality of commingled pieces of material having a mass equal to or greater than the predetermined mass; and
extract, with the material extraction apparatus, the plurality of commingled pieces of material from the stored material based on the insertion position, wherein the composite image is acquired after extracting the plurality of commingled pieces of material.

19. The system according to claim 10, wherein the circuitry is configured to determine the separation position based on which of the candidate separation positions minimizes an error between the estimated mass and the predetermined mass.

20. A method of material separation, the method comprising:
acquiring a composite image capturing a plurality of commingled pieces of material;
setting a plurality of voxels for the plurality of commingled pieces of material captured in the composite image;
estimating, for each of the plurality of voxels, a mass of the pieces of material corresponding to the voxel, as a voxel mass;
setting a number of candidate separation positions based on the composite image;
identifying, for each of the candidate separation positions, a subset of the plurality of commingled pieces of material;
calculating an estimated mass of each subset of the plurality of commingled pieces of material, based on the voxel mass of each of the plurality of voxels;
determining a position for separating a predetermined mass of pieces of material from the plurality of commingled pieces of material, as a separation position, based on a comparison of the predetermined mass with the estimated mass corresponding to each of the candidate separation positions; and
separating the predetermined mass of pieces of material from the plurality of commingled pieces of material at the separation position.

* * * * *